United States Patent [19]

Venable

[11] Patent Number: 5,461,493
[45] Date of Patent: Oct. 24, 1995

[54] IMAGE EDITING SYSTEM AND METHOD HAVE IMPROVED COLOR KEY EDITING

[75] Inventor: Dennis L. Venable, Rochester, N.Y.

[73] Assignee: Xerox Corporation, Stamford, Conn.

[21] Appl. No.: 214,022

[22] Filed: Mar. 15, 1994

Related U.S. Application Data

[63] Continuation of Ser. No. 772,717, Oct. 7, 1991, abandoned.

[51] Int. Cl.$^6$ ................................................. H04N 1/46
[52] U.S. Cl. ........................... 358/520; 358/537; 358/539
[58] Field of Search .......................... 358/500, 518–520, 358/523, 537–539; 382/17, 21, 56; 348/579, 580, 582, 587; 395/147, 148; 345/163, 167, 186, 189; H04N 1/46

[56] References Cited

U.S. PATENT DOCUMENTS

| | | |
|---|---|---|
| 4,167,729 | 9/1979 | Christenson et al. . |
| 4,488,245 | 12/1984 | Dalke et al. . |
| 4,649,423 | 3/1987 | Hoffrichter et al. . |
| 4,727,425 | 2/1988 | Mayne et al. . |
| 4,731,662 | 3/1988 | Udagawa et al. . |
| 4,758,885 | 7/1988 | Sasaki et al. . |
| 4,794,386 | 12/1988 | Bedrij et al. ............................. 340/703 |
| 4,821,336 | 4/1989 | Roye ........................................ 382/54 |
| 4,847,689 | 7/1989 | Yamamoto et al. ..................... 358/539 |
| 4,853,767 | 8/1989 | Sakai et al. ............................. 358/539 |
| 4,958,217 | 9/1990 | Kimura et al. ............................. 358/75 |
| 4,989,080 | 1/1991 | Ito . |
| 4,991,223 | 2/1991 | Bradley .................................... 358/22 |
| 4,992,861 | 2/1991 | D'Errico . |
| 4,992,864 | 2/1991 | Akiyama . |
| 5,003,616 | 3/1991 | Orita ......................................... 382/50 |
| 5,012,333 | 4/1991 | Lee et al. . |
| 5,089,884 | 2/1992 | Suzuki et al. ............................ 358/539 |
| 5,140,312 | 8/1992 | Ishii ........................................ 340/703 |
| 5,204,665 | 4/1993 | Bollman et al. . |
| 5,231,504 | 7/1993 | Magee . |
| 5,270,806 | 12/1993 | Venable et al. . |

Primary Examiner—Edward L. Coles, Sr.
Assistant Examiner—Kim Yen Vu
Attorney, Agent, or Firm—Finnegan, Henderson, Farabow, Garrett & Dunner

[57] ABSTRACT

An image editor for an image processing system has a predefined set of system colors. Color pixel color index values for an image to be edited are stored in an image buffer. A color lookup register bank stores color values in respective registers for a predefined set of system colors. Each buffer index value corresponds to a lookup register having the specified color value. The image is thus displayed by indexing the image pixels to the lookup register bank for the color signal inputs to the display. A mouse is used to designate displayed colors that a user desires to modify in a region of the displayed image. Pixel position data corresponding to the designated colors is detected and hue, saturation and brightness (HSB) values are determined from the stored color values for the designated image pixels. A minimum range of values is determined for each of the HSB variables. A preselected color edit operation is applied to those image pixels having colors corresponding to HSB values within the respective minimum HSB ranges.

19 Claims, 18 Drawing Sheets

IMAGE EDITING SYSTEM AND METHOD HAVE IMPROVED COLOR KEY EDITING

This application is a continuation of application Ser. No. 07/772,717, filed Oct. 7, 1991, now abandoned.

CROSS REFERENCE TO RELATED APPLICATIONS

Reference is made to the following concurrently filed patent applications that are assigned to the present assignee and are hereby incorporated by reference:

Ser. No. 07/772,718, entitled IMAGE EDITING SYSTEM AND METHOD HAVING IMPROVED AUTOMATIC OBJECT SELECTION by Michael R. Campanelli, Dennis L. Venable and Zhigang Fan, abandoned.

Ser. No. 07/772,719, entitled IMAGE EDITING SYSTEM AND METHOD HAVING IMPROVED MULTI-DIMENSIONAL EDITING CONTROL by Dennis L. Venable and James E. Bollman, U.S. Pat. No. 5,270,806.

Reference is also made to the following patent application assigned to the present assignee:

Ser. No. 07/517,895 entitled COLOR EDITING WITH SIMPLE ENCODED IMAGES, and filed by James E. Bollman and Myra E. Van Inwegen on May 2, 1990, abandoned.

BACKGROUND OF THE INVENTION

The present invention relates to image processing systems and methods and more particularly to image editors that employ color key editing.

Various kinds of image processing systems may employ color key editing or selection in image editing operations.

Color key selection uses pixel values to determine which pixels are to be modified in accordance with an editing operation. Editing or colorizing is then performed on all of the selected pixels (typically, defined by a bit mask) in accordance with a conventional editing operation such as TV Image or Line Art. The selected pixels are chosen by some suitable means.

Color key editing is often defined as a procedure in which pixel selection and colorizing are combined in a pixel-by-pixel operation.

One type of image processing system is a duplicator system in which a stored electronic image can be edited and applied to a platen to produce a hard copy output. Another system is a reprographic system in which a digital image is scanned from a hard copy input and then processed through an image editor to generate an edited hard copy output from a laser printer or the like. In an image edit system, an image editor processes stored images in accordance with edit operations and stores the edited images electronically for use in other systems.

Color editing generally is a process in which some means is provided for defining image pixels to which color changes are to be applied. In the prior art, for example, full color images are interactively edited on color display monitors of limited bit-depth using the techniques disclosed in the above referenced patent application Ser. No. 07/517,895.

However, color editing typically has been limited to adjusting all of the color lookup table entries that correspond to pixels in a well-defined closed region of an encoded form of the ETT full color image. Editing productivity and editing quality have accordingly been adversely affected. Thus, it may be difficult to define a region having only the colors that are to be changed, and as a result some colors may not be changed that should be changed or vice versa.

For example, consider an image of a tree with sky showing through the leaves. The sky color may be greenish because of erroneous use of tungsten indoor film for outdoor picture taking. As a result, tiny bits of sky showing through small spaces between the leaves are off-color. Correcting the sky color of the small tree spaces without washing out the spaces is at best very difficult with known prior art procedures.

In any case, the known prior art has had no capability for adaptive editing where editing operation on a pixel depends on the pixel color.

The following prior patents have been identified as having limited relevance to the present invention:

1. U.S. Pat. No. 4,167,729, "Apparatus For Obtaining Multi-Spectral Signatures", dated Sep. 11, 1979, filed by Dempster S. Christenson, et al.

2. U.S. Pat. No. 4,488,245, "Method And Means For Color Detection And Modification", dated Dec. 11, 1984, filed by George W. Dalke, et al.

3. U.S. Pat. No. 4,649,423, "Method and Circuit Arrangement For Selective Correction Of Hues And Colors", dated Mar. 10, 1987, filed by Ingo Hoffrichter, et al.

4. U.S. Pat. No. 4,727,425, "Pixel Color Modification Using Look-Up Tables In Image Reproduction System", dated Feb. 23, 1988, filed by Clive L. Mayne, et al.

5. U.S. Pat. No. 4,731,662, "Image Processing Method For Processing An Image Signal Differently Depending On The Range Of An Image Characteristic Thereof Relative To The Range Within Which Output Device Can Reproduce The Image Characteristic", dated Mar. 15, 1988, filed by Yoshiro Udagawa et al.

6. U.S. Pat. No. 4,758,885, "Method of Processing Color Image", filed Jul. 19, 1988, filed Takashi Sasaki, et al.

7. U.S. Pat. No. 4,989,080, "Color Correction Device With A Hue Area Judgment Unit To Determine Correction Parameters", filed Jan. 29, 1991, filed by Takanori Ito.

8. U.S. Pat. No. 4,992,861, "Color Image Reproduction Apparatus Having A Digitally Operated Look-Up Table Constructed by Means of a Least Squares Algorithm", dated Feb. 12, 1991, filed by John R. D'Errico.

9. U.S. Pat. No. 4,992,864, "Image Processor Having Density Indicator", dated Feb. 12, 1991, filed by Kazuya Akiyama.

10. U.S. Pat. No. 5,012,333, "Interactive Dynamic Range Adjustment System For Printing Digital Images", dated Apr. 30, 1991, filed by Hsien-Che Lee, et al.

SUMMARY OF THE INVENTION

It is an object of the present invention to provide a better color image editor in which color editing is performed adaptively in dependence on the original color value of each selected image pixel.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, there is provided an image editor for an image processing system having a predefined set of system colors and comprising means for storing color pixel data for an image to be edited and means for displaying the stored image on a monitor screen Means are provided for designating displayed colors that a user desires to modify in a region of the displayed image. Means are provided for detecting pixel position data corresponding to the designated colors.

Means are provided for determining and storing values for at least one color variable from the color pixel data for the pixel position data. Means are further provided for determining a minimum range of values for the color variable that encompass colors designated by the designating means. Means provide for applying a preselected color edit operation to those image pixels having colors corresponding to those color variable values within the minimum range.

The file of this patent contains at least one drawing executed in color. Copies of this patent with color drawing(s) will be provided by the Patent and Trademark Office upon request and payment of the necessary fee.

BRIEF DESCRIPTION OF THE DRAWINGS

The accompanying drawings, which are incorporated in and constitute a part of this specification, illustrate an embodiment of the invention and together with the description provide an explanation of the objects, advantages and principles of the invention. In the drawings:

FIGS. 7A–7C provide additional illustrations related to determining whether a hue value is within a tracked hue wraparound range.

DESCRIPTION OF THE PREFERRED EMBODIMENT

Reference will now be made in detail to a preferred embodiment of the invention, an example of which is illustrated in the accompanying drawings.

Figure 1:
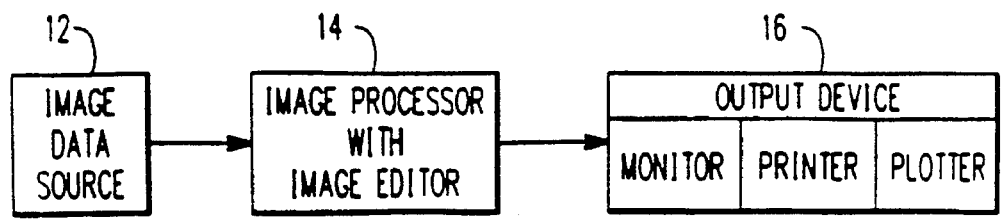
FIG. 1 shows a block diagram for a generalized image processing system in which an image editor arranged in accordance with the present invention is employed.

There is shown in FIG. 1 a general image processing system 10 which is representative of the various kinds of systems in which the present invention can be embodied. Image processing systems may be used for various purposes including the generation of images in the computerized process of creating newspapers, magazines, catalogs, brochures or other documents. High image quality is normally required to meet advertising artwork and other graphic needs in these processes.

The system 10 includes an image data source 12 that provides image data for an image processor 14 having an image editor. Processed image data is applied to an output device 16 such as a monitor, a laser or other printer, or a duplicating machine platen.

The image data may be organized for high quality, high density color displays. For example, in the preferred embodiment, the combined basic colors, i.e., red, green and blue, of each image element or pixel are stored as a total of twenty-four bit values. Each basic color can have $2^8$ or 256 values from 0 to 255. Accordingly, the total number of possible colors for each pixel in a color image is $256^3$ or greater than 16 million. In the preferred embodiment of the invention, effective, fast, quality image editing is achieved with computer capacity economy by encoding stored image data to a reduced color set, in this case a set of 100 preselected colors.

Figure 2:
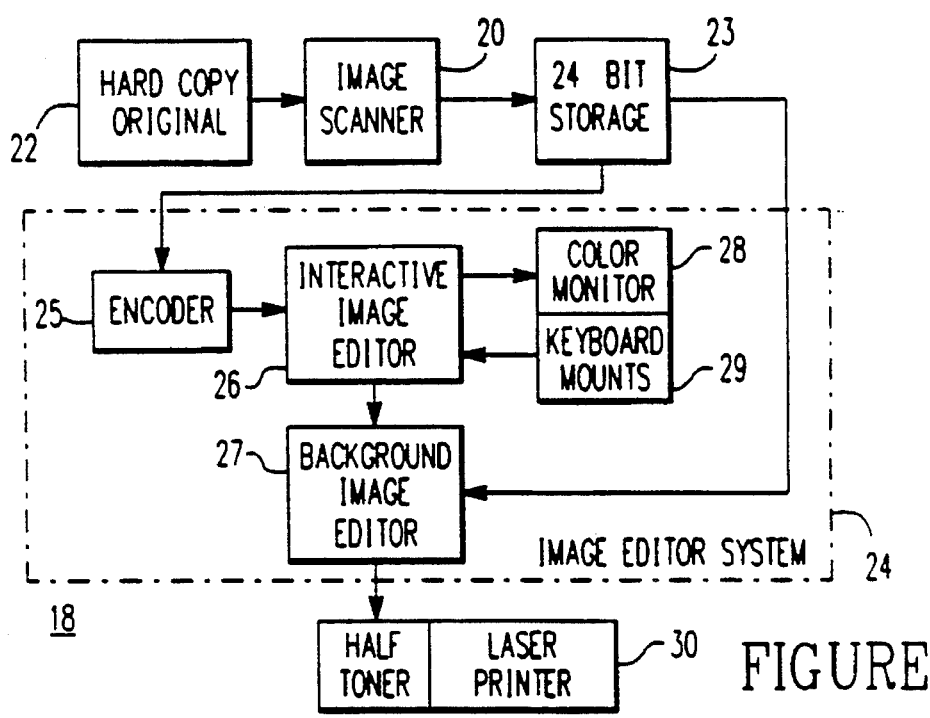
FIG. 2 shows a block diagram for a reprographic system which is a particular form of the image processing system of FIG. 1.

In FIG. 2, there is shown a specific kind of image processing system 10, namely a reprographic system 18, in which the present invention can be embodied. The reprographic system 18 may be a duplicating system which has an image editing capability.

An image scanner 20 detects image data from a hard copy original 22. The image data is placed in 24-bit storage 23 and then processed through an image editor system 24. An encoder 25 produces image data based on a reduced color set, and the reduced image data is applied to an interactive image editor 26.

The image edit system 26 processes the stored image to produce a modified image resulting from editing operations including operations performed in accordance with the present invention. A color monitor 28 and a keyboard monitor 29 are interactively operated with the image editor 26 in the editing process. Inputs are applied from the 24-bit storage 23 and the interactive image editor 26 to a background image editor 27. The edited image is applied from the background image editor 27 to an output device, in this case a laser printer 30 that will produce a requested number of copies.

Figure 3:
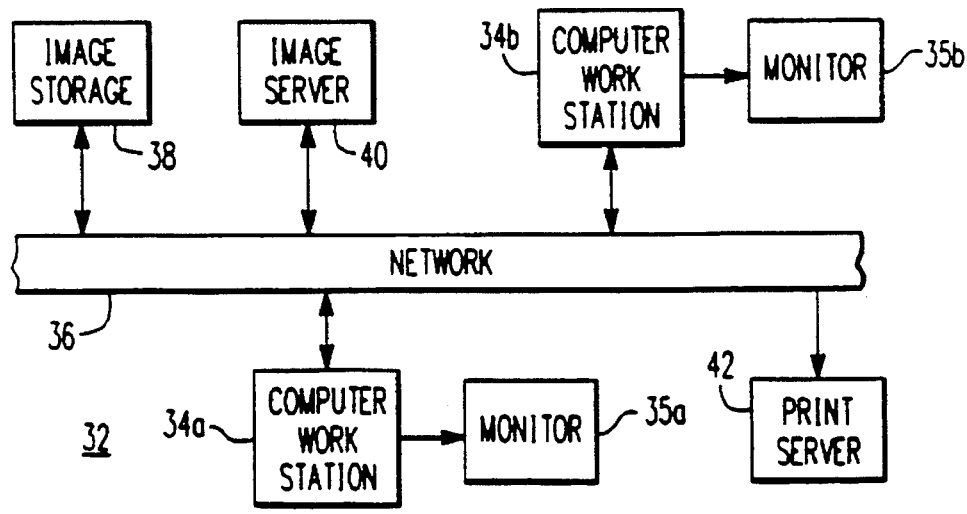
FIG. 3 shows another block diagram for a network based image processing system in which the preferred invention embodiment described herein is employed.

In FIG. 3, another kind of image processing system 10 is shown, namely a networked system 32 having a plurality of image editing computer work stations 34a and 34b with associated color monitors 35a and 35b. A network 36 for the system 32 additionally has coupled to it an image storage apparatus 38, an image server 40 and a print server 42, and, if desired, various other subsystems. On request, the image server 40 provides various more complex image processing services to the work stations. The networked system 32 is the type of system in which the preferred embodiment of the invention is implemented.

IMAGE EDITING WORK STATION

Figure 4:
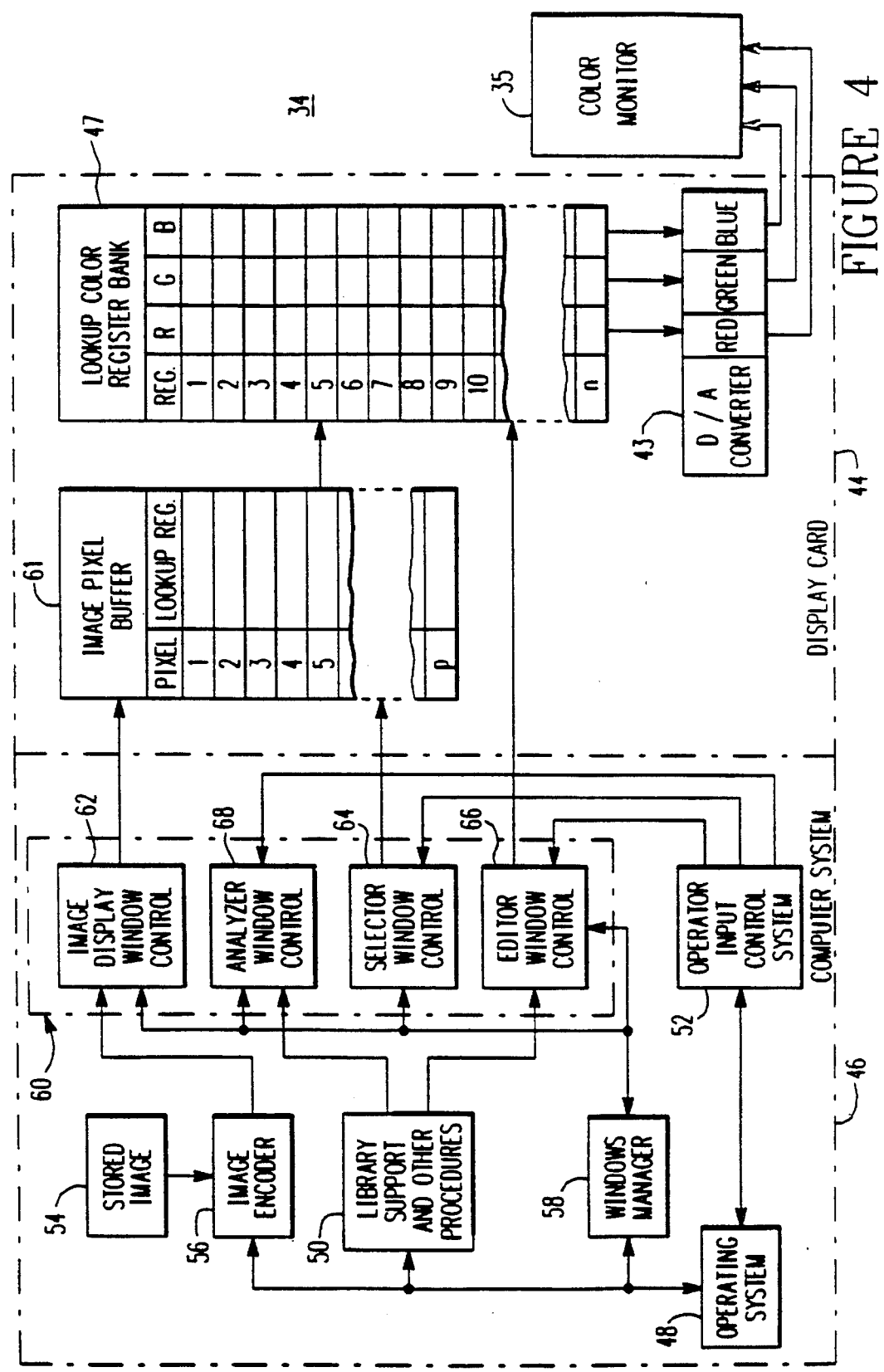
FIG. 4 illustrates a more detailed block diagram for a computer work station arranged in accordance with the principles of the present invention and employed in the network based system of FIG. 3.

An image editing work station 34, corresponding to the work station 34a or 34b in FIG. 3, is shown in greater block diagram detail in FIG. 4. A color monitor 35 provides a display in accordance with red, green, and blue color signals generated by drive circuit means. In the preferred embodiment, the drive circuit means preferably comprises a digital-to-analog converter 43 on a display card 44.

As indicated in FIG. 4, a digital color signal for each screen pixel comprises digital red, green and blue signals supplied by lookup color registers 47. Each of the three components of the color signal is an 8-bit signal. Successive screen pixel signals are converted to analog signals by the converter 43 and rastered onto the monitor screen 35 in the conventional manner.

A digital computer system 46, such as a Sparc Station II™ preferably operates the display card 44 to generate the monitor display. In other applications of the invention, the functional interface between the digital computer system 46 and the display card 44 may be varied from that which exists in the preferred embodiment Programmed operation of the computer system 46 occurs under the direction of an operating system 48 such as UNIX™. Library support and other procedures 50 are included in the computer program system as needed for the image processing application and for system operation.

An operator input control system 52 includes means for entering image editing actions and for otherwise directing the computer system operation. In the preferred embodiment, the operator input control 52 includes a mouse (not specifically indicated) which provides various kinds of operator editing entries through interaction with the display on the color monitor 35. The preferred operator control also includes a keyboard for operator entry of alphanumeric editing entries. In other applications of the invention, other operator control devices, such as light pens, pressure sensitive pads, etc., can be employed.

Images to be processed by the work station 34 are suitably stored. Each image is formed by a predetermined number of pixels each of which is typically and preferably herein defined by three 8-bit words respectively for the red, green and blue color components.

When a stored image 54 is called by the operator for edit processing, the image 54 is first processed in the preferred embodiment by an image encoder 56 to encode the image with a reduced set of preselected colors for effective yet economic image editing for reasons previously explained. A conventional image algorithm program, such as Floyd-Steinberg error diffusion, is employed for the image encoder 56.

Image editing is preferably facilitated in the work station 34 by the use of a windowed display on the screen of the color monitor 35. A conventional windows manager control 58, such as Windowing System™, as developed by MIT, is employed in the computer program system to control the basic windowed structure of the monitor display.

Encoded image editing means is included in the work station 34 to enable the image 54 to be modified in various ways. The image editing means preferably includes the operator input control system 52, various computer editor controls 60, and an image storage means preferably including a lookup color register bank 47 and an image pixel buffer 61 on a display card 44.

As previously indicated, prior art techniques for editing images have typically employed procedures having limited productivity. The present invention provides significantly enhanced productivity through the image editing means which is characterized with improved structure and operation.

The encoded stored image provided by the image encoder 54 is handled by an image display window control 62 for screen display in an image window (not illustrated). The size and location and screen pixel assignments of the image window 55 are determined by the windows manager 58. The color content of each image pixel in the image window 55 is defined by the image pixel buffer 61 in combination with the lookup color register bank 47. An editor menu window 63 (FIG. 5A) is employed in edit operations.

The lookup color register bank 47 contains n registers including a group of registers that respectively define the R, G, and B values of the respective colors in the set of colors preselected for system use. The color lookup register assigned to a particular image pixel generates the output color signals that produce the screen pixel corresponding to the image pixel.

The image display window control 62 loads the encoded image into the image buffer 61. In the preferred embodiment, the encoded image includes an index value for each image pixel pointing to a color lookup register that contains the R, G, and B values corresponding to the color for that pixel. As indicated in FIG. 4, the image pixel buffer 61 stores the number of the lookup register specified for each image pixel. Image pixels are thus processed for screen display by reference to the designated lookup registers in the pixel buffer 61.

The editor controls 60 also include a pixel selector window control 64 that is operated through a selection menu window 59 (FIG. 5B) and provides the operator with options for limiting or providing boundaries on the extent to which the image stored in the buffer 61 is to be subjected to color and other edit actions. In the preferred embodiment, the optional selectors include:

a. Brush.

b. Freehand.

c. Rectangle.

d. Polygon.

e. Color key.

f. Automatic object selector.

Figure 5A:
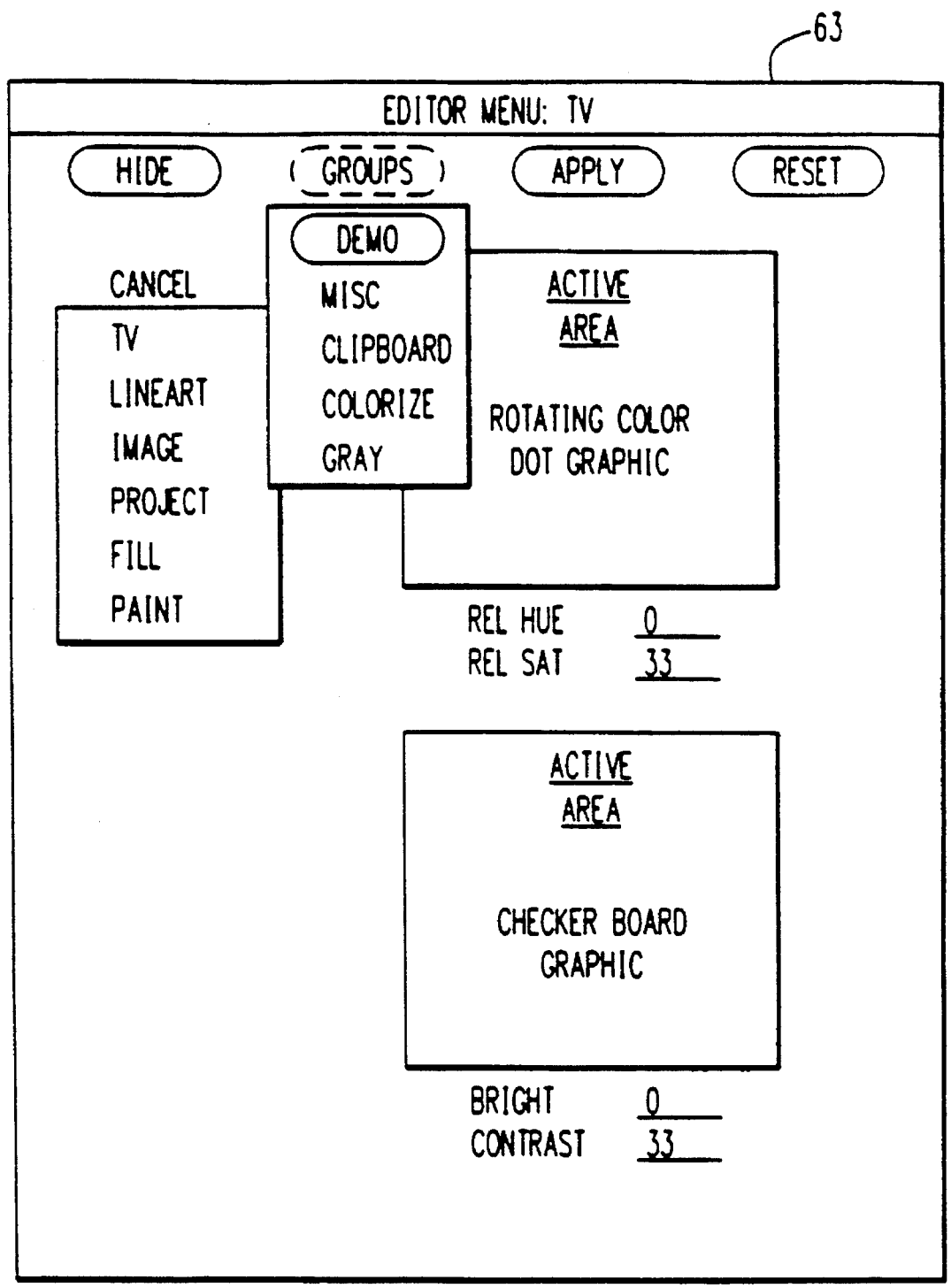
FIGS. 5A and 5B show editing controls and selector menus employed on a screen of a work station monitor in accordance with the present invention.
Figure 5B:
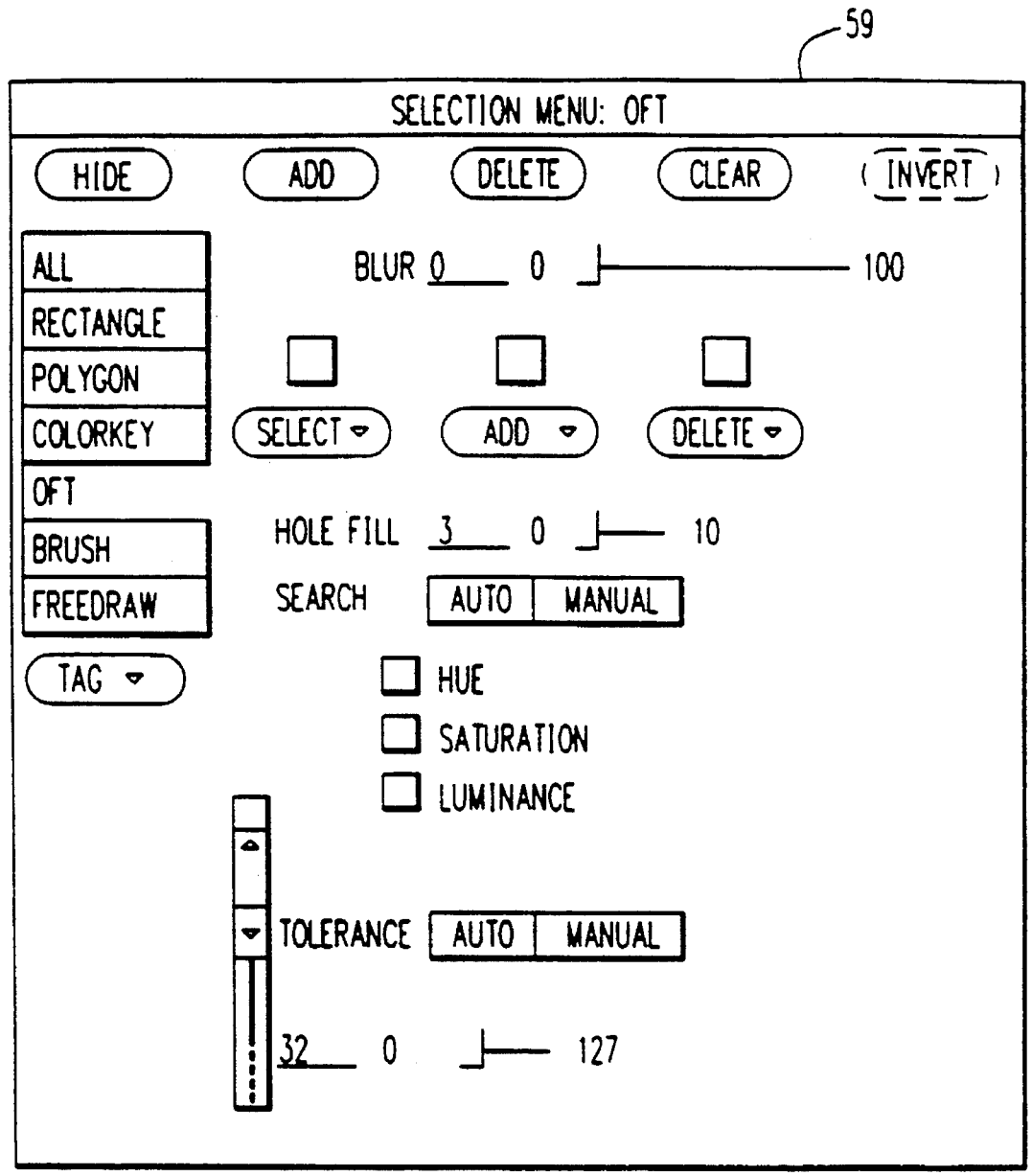

Once a pixel selector is chosen by the operator, color editing of the image is limited to pixels defined by the chosen selector. An editor window control 66 implements various editorial operations selected by the operator from the editor menu window 63 (FIG. 5A). In the preferred embodiment, editorial operations or user procedures that can be selected include:

a. TV color.

b. Line art.

c. Image color.

d. Hi-light.

e. Rotate.

f. Crop.

g. Scale.

h. Filter.

In many of the user procedures, operator selections in an active box in the editor menu window are implemented in real time on the image in the image window. In other cases, operator selections are displayed in a separate box in the editor menu window and then implemented on the image in the image window upon operator command.

In the various edit operations, color modifications are implemented through the color lookup bank 47 as indicated in FIG. 4. Thus, any single original color selected for change to a selected new color, in accordance with a particular edit operation, is changed to the new color by modifying the R, G, B values in the lookup register for the original color and storing the modified values in a work lookup register bank.

When the image is thereafter displayed in the image window, any screen pixels in the image, or within selected limits of the image, that have the specified single original color are automatically assigned the modified color in the work register. Multiple color modifications in a single edit operation are simultaneously implemented in the manner described for the single color modification.

An analyzer window control 68 enables the operator to employ the computer to provide image analysis. For example, the operator may request: get pixel color or provide histogram.

Once an edited image becomes acceptable to the operator, it is saved by actuating a save selector and implementing appropriate save procedures. The system can then be cleared to its initialized state and a new image may be called from storage for editing.

COLOR KEY EDITING CONTROL

As previously indicated, the pixel selector window control 64 (FIG. 4) includes a color key as a means for defining boundaries on the extent to which the image stored in the buffer 61 is modified by a color edit operation. Generally, selective editing is achieved by limiting the edit operation to selected image pixels.

In accordance with the present invention, color key editing logically applies colorizer operations to pixels that obey specific rules about their color. Colors to be edited are designated on the screen, and a range of values for each of one or more predetermined color descriptor variables is determined for the designated colors. In the preferred embodiment the color descriptor variables are hue, saturation, and brightness.

Each determined value range operates as a pixel rule. That is, image pixels are examined to determine whether they fall into or out of each range. In-range pixels are modified by a selected editing operation. Out-of-range pixels are not modified.

In the preferred embodiment, hue, saturation, and brightness ranges must all be satisfied for a pixel to qualify for editing. In other applications of the invention, the rule may be that any one or more of the color descriptor variable ranges be satisfied for a pixel to qualify for editing. Further, descriptor variables other than hue, saturation, and brightness may be employed.

Color changes can be made by the color key selection procedure or by the conventionally defined color key editing procedure or by other suitable procedure. In the preferred embodiment, color changes are made by the conventionally defined color key editing procedure. However, since the invention principles can be applied in any of the various colorizing procedures, the term "color key editing" as used herein in describing the invention is intended to embrace all of the applicable colorizing procedures.

Color editing control means determines RGB color values for designated image pixels, converts the pixel values to a color descriptor space, preferably the hue-saturation-brightness (HSB) space as previously indicated, determines HSB value ranges for the designated pixels, and modifies only those colors in the system color set that fall within the HSB ranges. In the preferred embodiment, color modifications are made in the color lookup register bank 47, also known as a color lookup table (CLUT), only for those colors within the HSB ranges. Thus, only those image pixels that index the modified color registers are modified in color on the screen.

As previously indicated herein, a full color image can be encoded for screen display using a relatively small color set. The techniques described in the referenced patent application Ser. No. 07/517895 can be used for the image encoding.

In the preferred embodiment, a 24-bit image is displayed on an 8-bit screen by encoding the full color image to a color set consisting of 100 or so colors in accordance with the referenced techniques. Each pixel of the original 24-bit image is replaced by a single 8-bit value (in the encoded image) which is an index to an array filled with the RGB values of the small color set. The RGB values array is loaded into the CLUT 47 and the encoded image is loaded into the image buffer. The monitor display hardware uses the CLUT 47 to determine what color to display on the screen for each pixel. If the RGB values are changed in the CLUT, any pixels displayed on the screen that correspond to the changed CLUT entries are also changed.

In providing color-key editing in accordance with the present invention, only those color entries in the CLUT that have RGB values that fall into specific ranges of hue, saturation, and brightness are adjusted. The method by which these ranges are determined and used is illustrated in the flow charts of FIGS. 6A–6L.

The specific HSB ranges are determined by clicking and dragging the previously referenced mouse over areas of the displayed, encoded image that have color indicative of the desired ranges. As the mouse is dragged around the displayed image, the range of hue, saturation, and brightness that is swept over is tracked, and any requested modifications are dynamically applied to the image. Thus, range selections are made by sweeping over pixels that basically represent the color ranges desired to be edited. The application of modifications can occur simultaneously with the selection of ranges.

A user interface (not shown) to this type of editing may comprise sliders for defining the amount of hue rotation (in the case of TV color editing), brightness change, etc., that is desired. There is also a set of controls that can be manually used to specify the ranges of hue, saturation, and brightness.

As an illustration of color keyed image editing, consider the previously referenced image of a tree with sky showing through the leaves. To adjust the color of the sky, the user sweeps the mouse over visible sky. As the range of color descriptors is defined, each color in the CLUT 47 is checked as to whether it lies within the defined ranges. Each CLUT color is modified only if it lies within the defined ranges. The end result is that when the sky color selection is completed, the image edit operation will have corrected the color of the visible sky as well as tiny bits of sky showing through the leaves.

The mechanism by which the user selects the range of colors to be adjusted is an important aspect of the present invention. Thus, the user click-and-drags the mouse in a region of the displayed image that represents the desired colors. As the mouse is dragged, display pixels in a small area (e.g., 5×5 block) under the mouse are analyzed and stored as a brightness, a hue, and a saturation.

As each new color is stored, ranges of hue, saturation, and brightness are updated. The ranges are the minimum ranges which encompass all of the stored colors. All colors in the CLUT 47 are tested to determine whether they lie within these ranges, and, if so, the entries are adjusted according to the selection algorithm.

Once the color ranges are defined interactively, they can be used to apply a color-key edit on a full color, non-encoded image. Results appear best for images such as line art that contain large areas of constant color.

To improve the results of applying interactively defined color ranges to full color, non-encoded images, the selection algorithm is modified as follows. While tracking the colors in the small block under the mouse, the average color of the block and the standard deviation of the colors are also tracked. When applying color-key editing to a full color image, use ranges specified by the color value ±K times the standard deviation are used. The value of K may be set by image heuristics.

Each pixel in the display image is represented by an integer index to the CLUT 47. The actual display color (in RGB values) is found by reading the RGB values from the CLUT 47. If a tone reproduction correction has also been applied to linearize the display, the correction curves are inverted to extract actual colors from the corrected colors.

COLOR KEY EDITING PROCEDURE

Figure 6A:
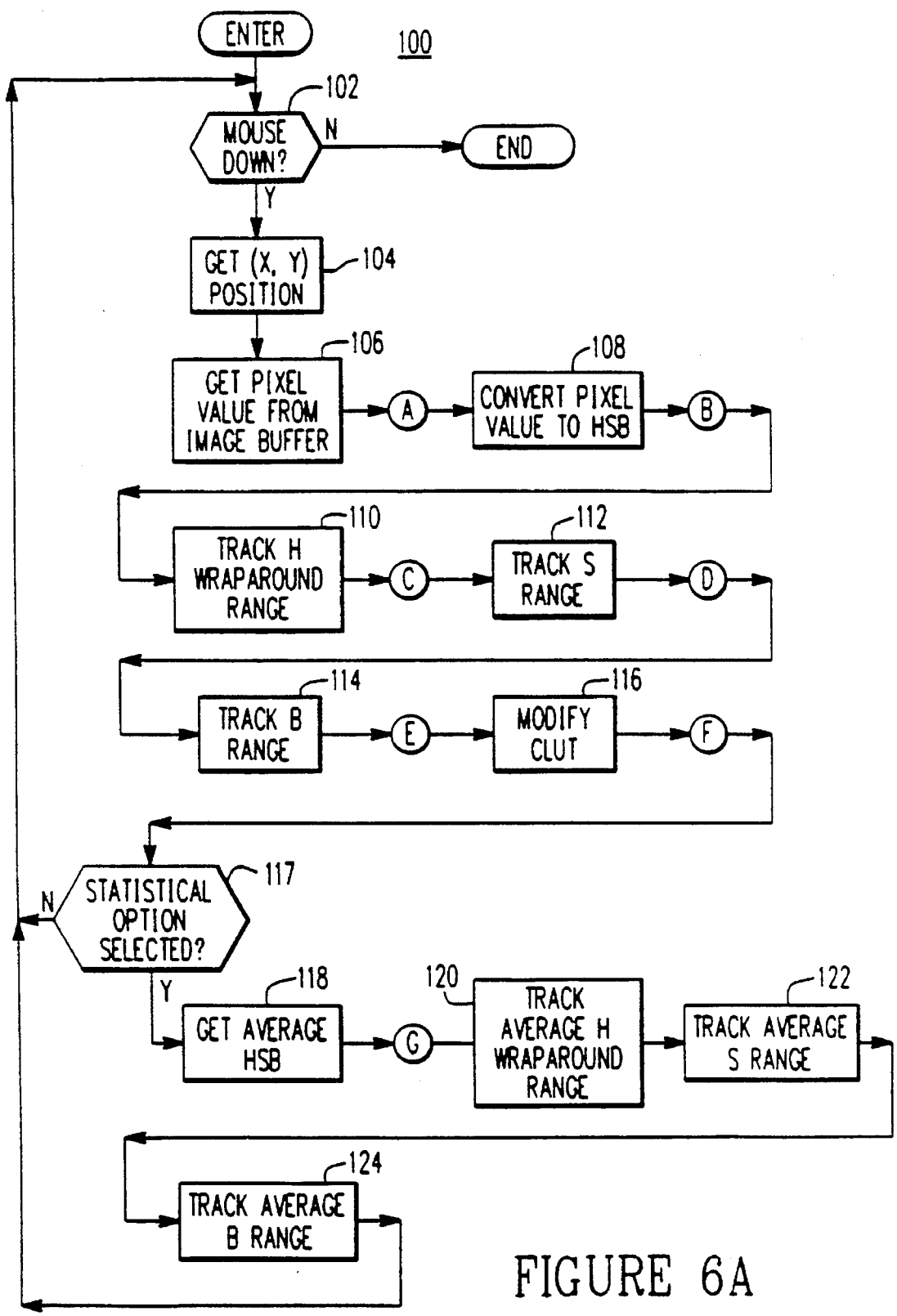
FIG. 6A shows a flow chart for a main procedure employed by the color key editing control in accordance with the present invention.

The preferred procedure for color key editing in accordance with the present invention is illustrated by an overview flow chart 100 in FIG. 6A. After a color key selector is operated, the color key procedure 100 is entered, and once the mouse is detected to be down by test block 102, the mouse position is determined by block 104.

Pixel values for a small pixel block about each successive mouse position are determined from the image buffer 61 by a block 106. The pixel block contains 25 pixels in the preferred embodiment. Next, each pixel value is converted to hue, saturation, brightness (HSB) values in a block 108. The H wraparound, S, and B ranges are tracked by respective blocks 110, 112, and 114.

A functional block 116 then modifies those CLUT registers having a color within the determined ranges. The color modifications are made in accordance with color value specifications provided by whatever edit operation is being used by the user.

In test block 117, a determination is made as to whether a statistical option has been exercised by the user for full color editing. If not, a return is made to the mouse test block 102 to recycle through the procedure 100 to process the next input pixels or to end in block 125 if the mouse has been removed.

If the statistical option has been exercised at block 117, data values are collected for analysis by statistical means. The analysis may involve use of standard deviations, histograms or other statistical tools and it may employ an optimizing procedure depending on the needs of the particular application. In the preferred embodiment, the full color edit option employs an averaging procedure.

Accordingly, the average HSB values are calculated by block 118. Blocks 120, 122, and 124 track average H wraparound range, average S range, and average B range, respectively, for the reasons previously presented. After option processing, a return is made to the mouse test block 102 to process the next mouse position by the procedure 100.

The hue range is tracked with an algorithm different from the algorithm employed for tracking saturation range and brightness range. The basic reason is that hue is normally defined in a circular domain, namely an angle that has no absolute minimum or maximum. For example, counter-clockwise angular rotation beyond −180 degrees wraps around to +179 degrees.

Figure 6B:
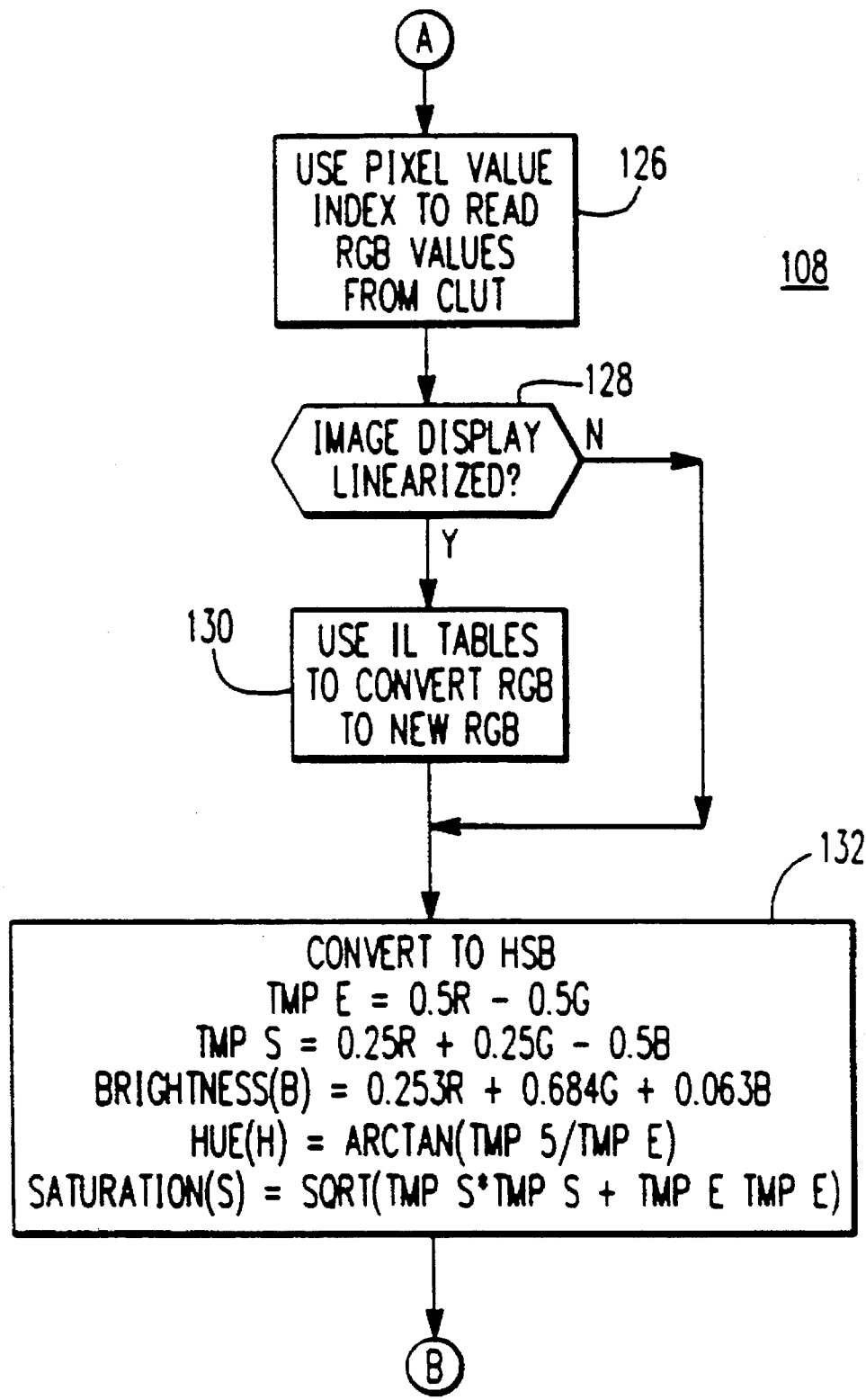
FIG. 6B shows a flow chart for a pixel value conversion procedure used in the procedure of FIG. 6A.
Figure 6C:
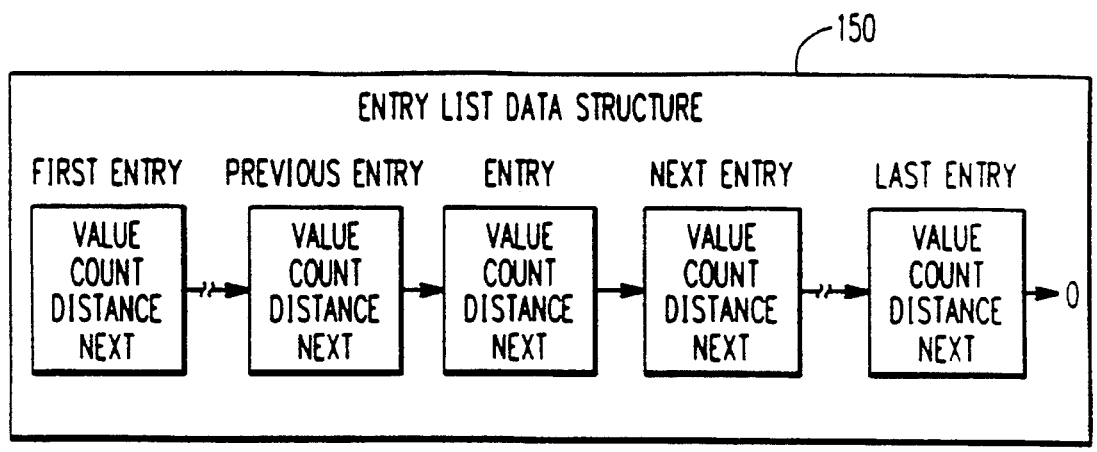
FIG. 6C illustrates an entry list data structure used in operation of the color key editing control of the present invention.
Figure 6D:
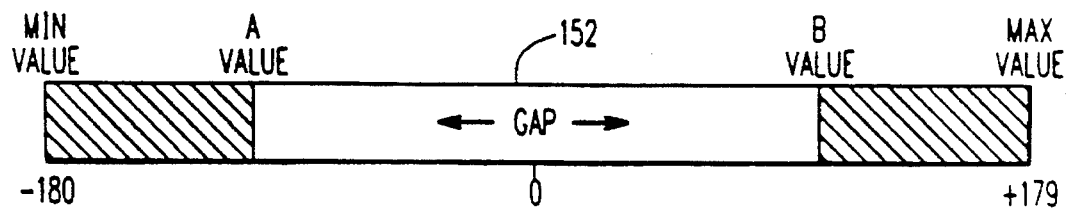
FIG. 6D graphically illustrates range tracking for hue.
Figure 6E:
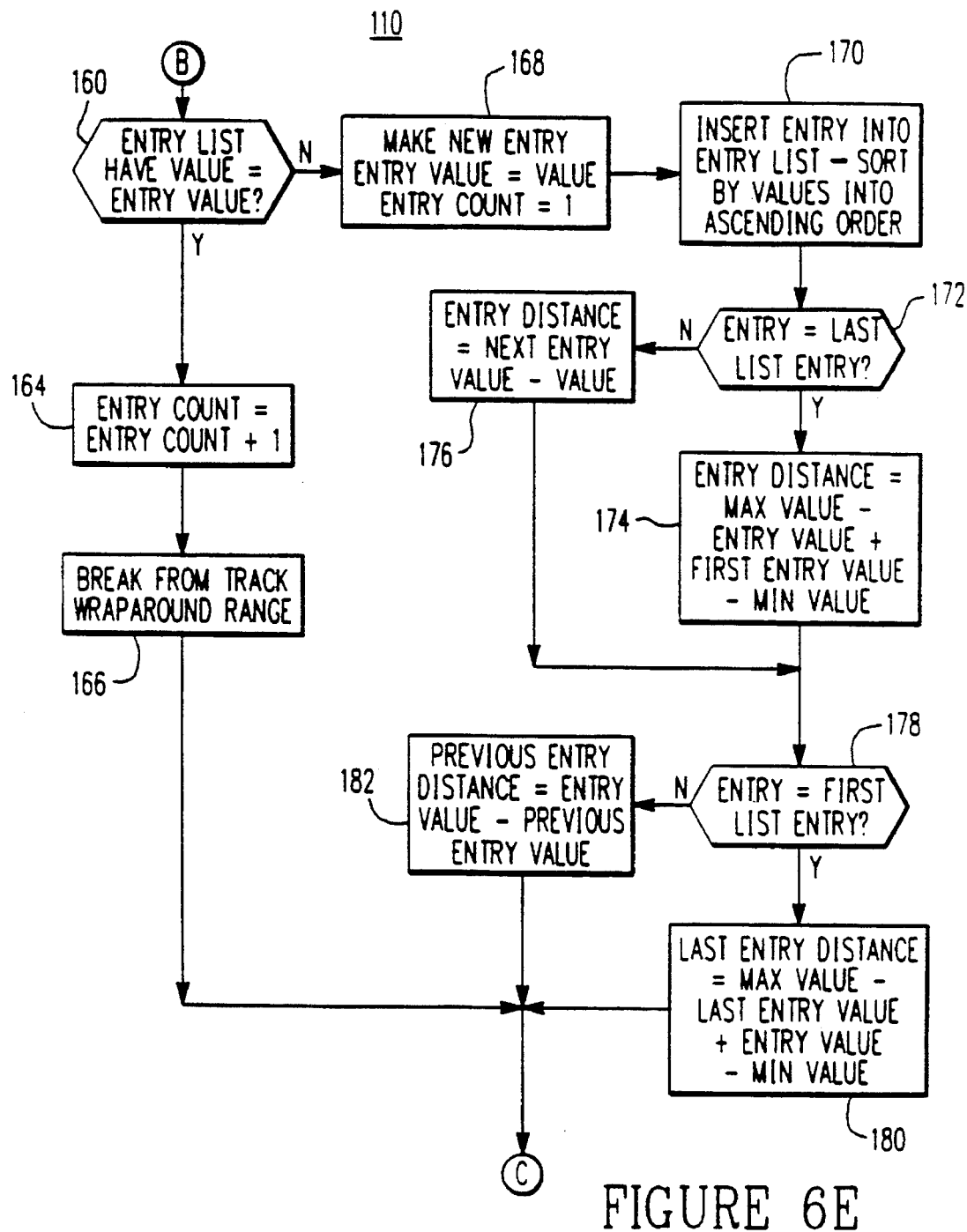
FIG. 6E shows a flow chart for a wraparound range tracking procedure used in the procedure of FIG. 6A.

A preferred algorithm employed in the block 110 for tracking the range of a circular domain variable is illustrated in FIG. 6E. A preferred algorithm for tracking the linear domain variables S and B is illustrated in FIG. 6G. If desired, linear domain variables can be treated as a circular domain and tracked accordingly.

In FIG. 6B, the pixel value conversion procedure is shown in greater detail. Thus, block 126 uses the pixel value index to read RGB values from the CLUT 47. Test block 128 determines whether the displayed image is linearized, and, if so, block 130 uses inverted linearization tables to convert the correctively linearized RGB values to actual RGB color values.

Block 132 employs the listed equations to calculate the HSB values from the actual RGB values. HSB values can be based on any of various luminance-chrominance color spaces such as CIELAB, CIELUV, YIQ, etc. In the preferred embodiment, Xerox™/yesLinear™ color space is employed.

As indicated previously, a special procedure is needed for dynamic tracking of a circular variable, and in particular for tracking hue in the present embodiment. A circular variable has no minimum or maximum value because it "wraps around". Consider a hue range 140 shown in FIG. 7B1. A linear representation 142 of the range 140 is shown in FIG. 7B2 with hue measured from −180 degrees to +180 degrees.

The range appears to be split due to the wraparound. This would conventionally double the conditional checking to determine acceptable values in the desired range. This particular wraparound can be avoided by measuring hue from 0 to 360 degrees as represented at 144 in FIG. 7B3, but a problem still remains when going through 0 degrees. Thus, simple tracking of the minimum and maximum hue value is inadequate for the measurement of a hue range.

The procedure employed in the present invention expects a sequence of hue values as input. The hue values need not be ordered in any particular fashion. The actual hue value can be mapped into an integer value for speed such as integers −180 to 179 or 0 to 255 for single byte storage.

Figure 7A:
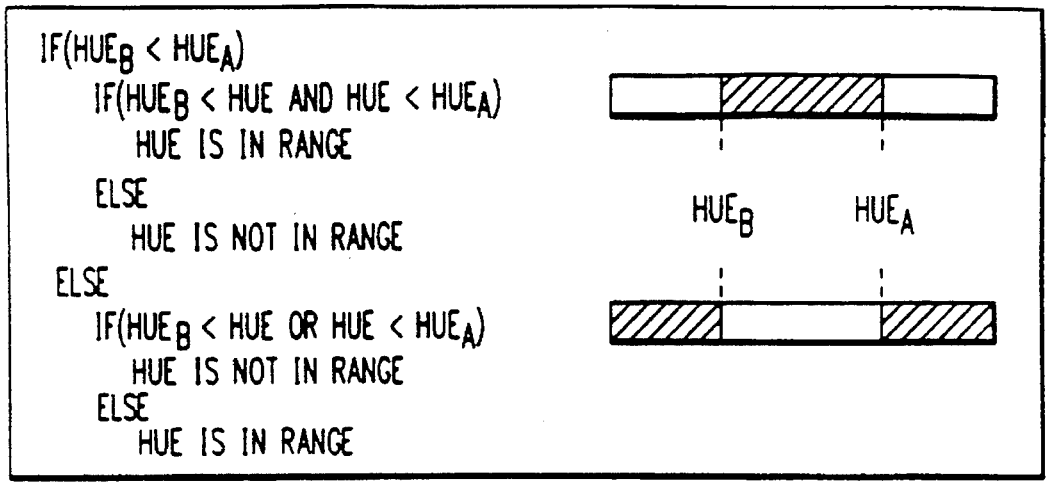
Figure 7C:
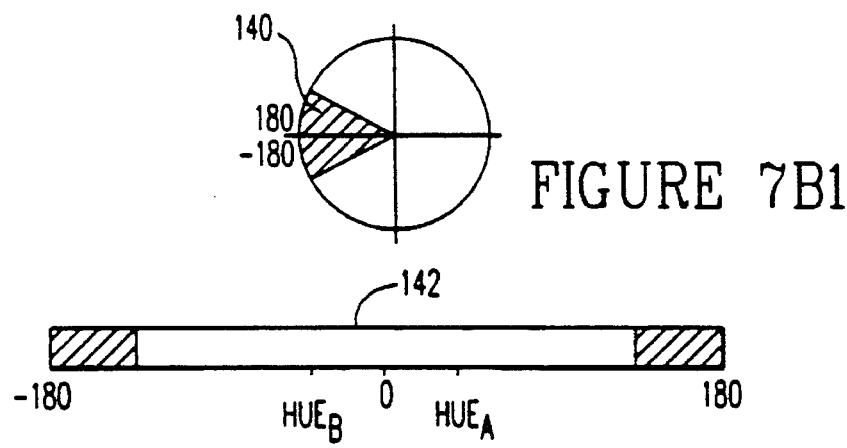
Figure 7C:
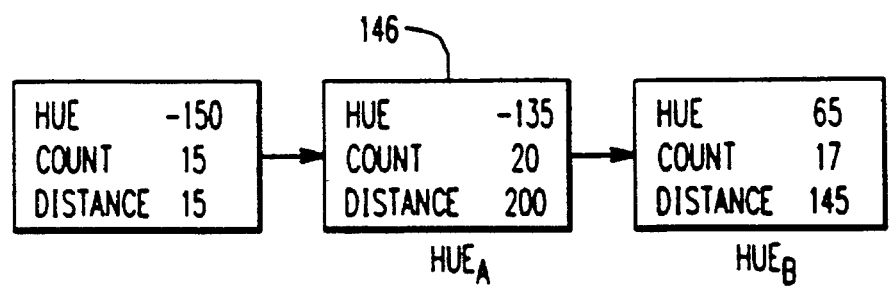

As each hue value is captured, it is inserted into a sorted linked list 146 of data structures (FIG. 7C). The list 146 contains exemplary data values, and it always has less than or an equal number of elements in the components range. Each data structure contains the hue value, the number of times this particular hue value has occurred, and the distance to the next entry in the list. The distance to the next entry is the difference between the hue value of the next list entry and the current hue value.

The distance for the last item in the list is calculated at the end of inputting values. The distance assigned to the last entry in the list is the sum of the distance to the maximum hue value and the distance from the minimum hue value to the first list entry.

To determine the selected range, the list is searched for the entry A with the largest distance value, indicating the longest range in which no hue values have occurred. The next entry is B. If A is the last entry in the list, B is the first entry in the list.

The selected hue range is the complement of the range $Hue_A$ to $Hue_B$, i.e., the selected range is the range $Hue_B$ to $Hue_A$. If $Hue_B$ is greater than $Hue_A$, then the range wraps around. Another way to determine wraparound is: if $Hue_A$ is not the last structure in the list, wraparound exists.

A particular hue is tested to determine whether it is in the selected range as shown by a procedure in block 148 of FIG. 7A. In the procedure shown in block 148, the only difference between the wraparound case and the non-wraparound case is the use of a logical OR instead of a logical AND. In the example data in the list 146, the longest distance corresponds to the middle entry B. Therefore the selected range is from the rightmost entry C to A (the leftmost entry), i.e., from a hue of 65 to a hue of −150. Since 65 is greater than −150, the selected range must wraparound.

FIG. 6E shows the preferred wraparound track procedure 110 in greater detail. Generally, each hue value is stored in a sorted list of records 150 (FIG. 6C) and the largest domain gap 152 (FIG. 6D) that contains no values is identified. The tracked range is the region of the circular domain outside the largest gap.

With reference to FIG. 6C, each unique incoming hue value is stored in the "entry_list". Each member of the list contains several items of information. Entries inserted in the list are sorted in ascending order. Therefore, the value associated with "entry" is a larger number than the value associated with "prev_entry" and is less than the value associated with "next_entry". If an entry already exists with a value equal to the incoming value, then the "count" field of the entry is incremented by one. This allows the total number of a specified value to be tracked for proper calculation of averages. With reference to FIG. 6D, "max_value" is the maximum value the incoming value can take before wrapping to the "min_value"; for example, the max_value is 179 degree and the min_value is −180 degrees for tracking of ranges in hue in the present embodiment.

With reference to FIG. 6E, the wraparound track procedure 110 is entered with a test made in block 160 to determine whether the entry value is already in the entry list. If so, block 164 advances the entry count for that value by one. The processing then breaks in block 166.

Any entry not found in the list is processed by block 168 where a new entry is made and the entry count is set to one. In block 170, the new entry is inserted in the list with sorting by value in ascending order.

If test block 172 determines that the current entry is the last entry, block 174 calculates the entry distance as the maximum value less the entry value plus the first entry value less the minimum value. If the current entry is not the last entry, block 176 makes the entry distance equal to the next entry value less the current value.

Test block 178 next determines whether the current entry is the first list entry. If so, block 180 makes the last entry distance equal to the maximum value less the last entry value plus the entry value less the minimum value. If not, block 182 makes the previous entry distance equal to the entry value less the previous entry value. After execution of the block 166 or 180 or 182, program execution returns to the main procedure 100.

Figure 6F:
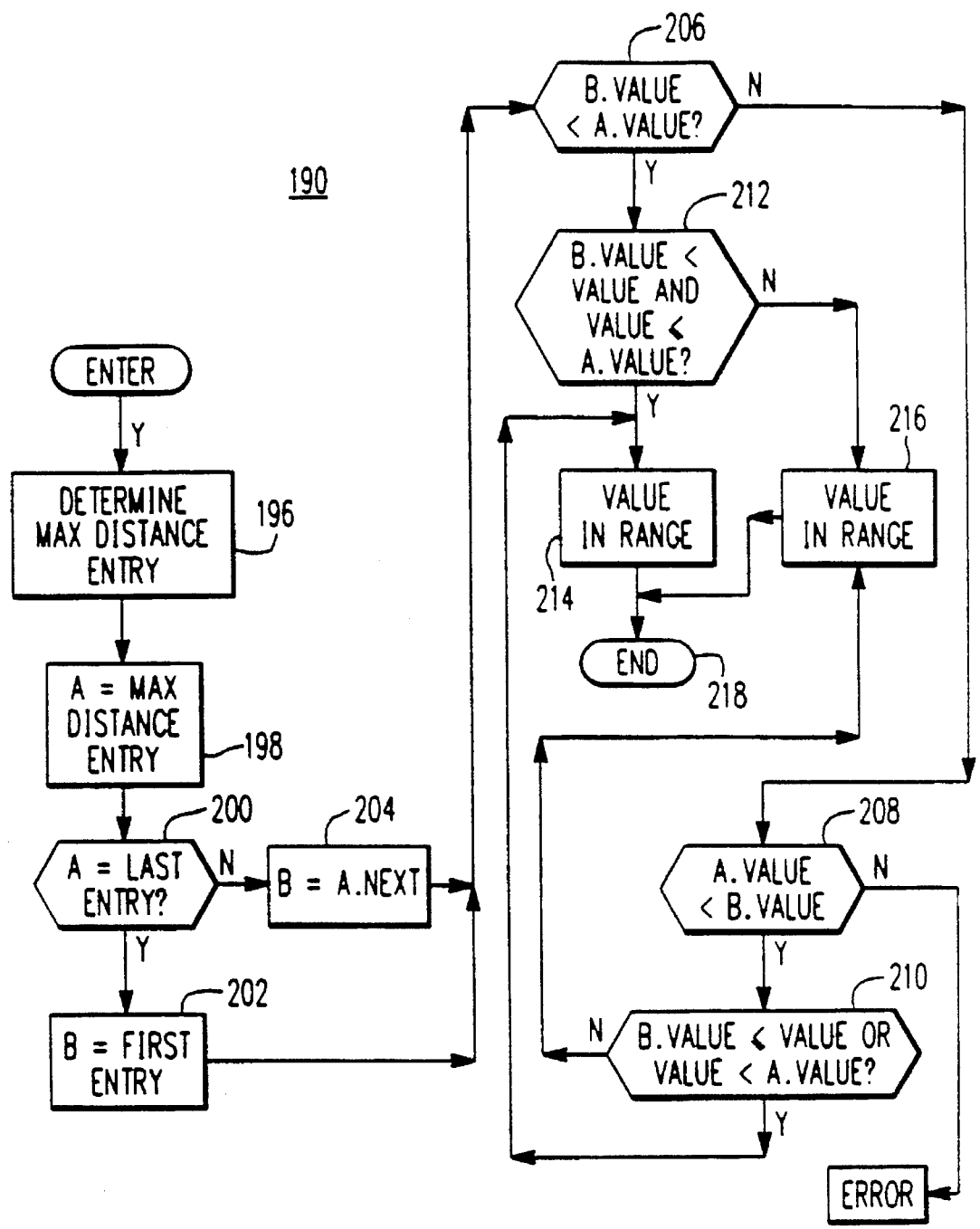
FIG. 6F illustrates a procedure used in the procedure of FIG. 6A to determine whether a hue value lies in a tracked hue wraparound range.
Figure 6G:
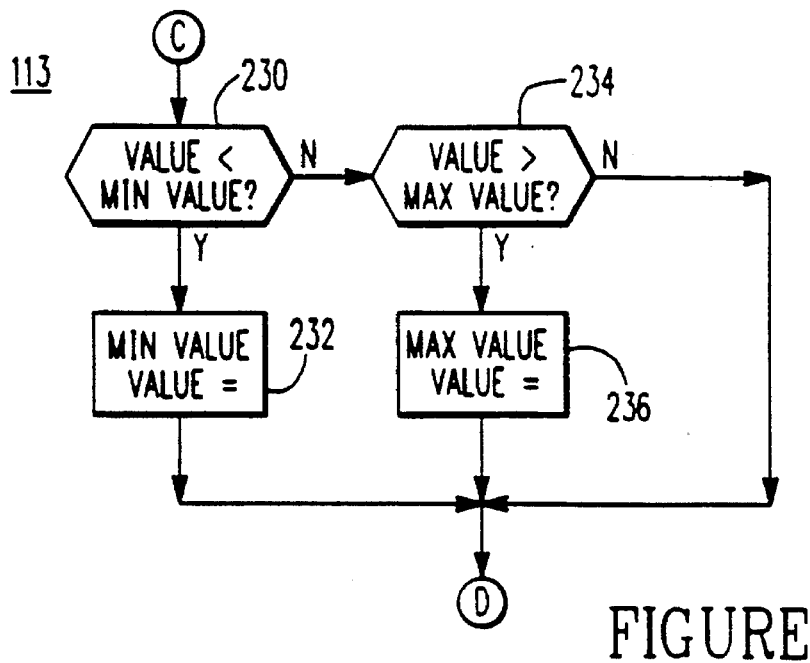
FIG. 6G shows a flow chart for a procedure used in the procedure of FIG. 6A to track saturation or brightness range.
Figure 6H:
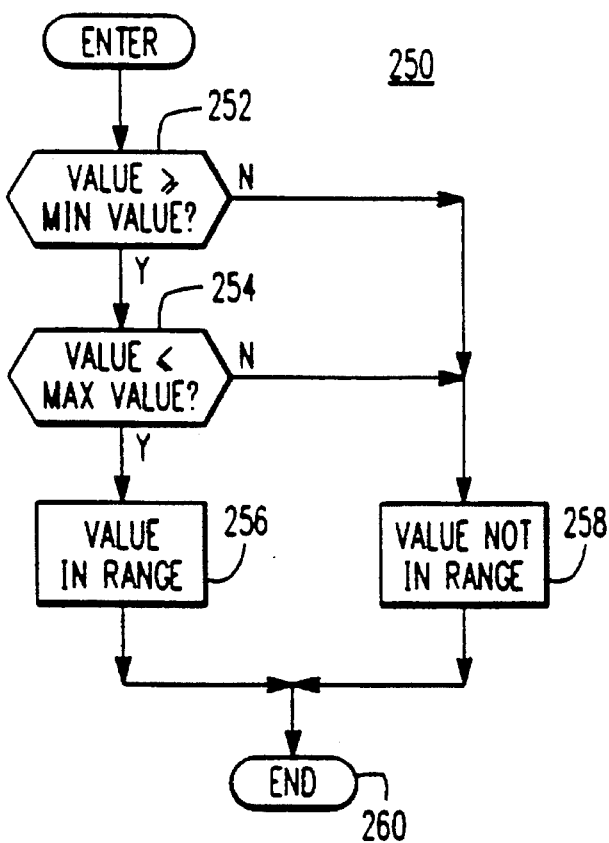
FIG. 6H is flow chart for determining whether a brightness or saturation value is within a tracked range.

A procedure 190 shown in FIG. 6F is employed in the preferred embodiment of the invention to determine whether a hue value is in the wraparound range. Generally, to determine whether a given value is within the selected range of a circular domain, the entry_list 150 structure (FIG. 6C) that has been built is analyzed.

First, the entry_list 150 is scanned to determine which entry has the largest distance field and denote this entry as A. The distance field indicates how big a gap (in units of "value") exists to the next entry in the entry_list 150.

The next entry in the entry_list 150 is designated as entry B. The selected range is then defined as all values that do not exist in the gap between values A.value and B.value.

Block 196 (FIG. 6F) determines the maximum entry distance. In block 198, the maximum distance entry is made equal to A.

Block 200 tests whether A is the last entry. If so, block 202 makes B equal to the first entry. If not, block 204 makes B equal to A. NEXT.

Test blocks 206, 208, and 210 check the relationship between the current value and A.value and B.value to determine whether the current value is in range. Thus, if B.value is less than A.value and block 210 indicates B.value is less than value and value is less than A.value, the value is recorded in range in block 214. However, if current value is less than B.value or greater than A.value, block 216 records the current value as out of range.

If A.value is less than B.value (block 208), and if B.value is less than or equal to current value or current value is less than A.value, the current value is recorded in range for the block 214. If not, the block 216 records the current value as out of range. If the block 208 tests false, an error is generated. Block 218 ends the range search procedure after each entry is processed.

A track range procedure 113 used in the blocks 112 and 114 (FIG. 6A) to track B and S values is shown in FIG. 6G. The linear brightness and saturation domains are tracked using minimum and maximum values. Thus, test block 230 checks whether the current value is less than the minimum value. If so, the value is set equal to the minimum value in block 232.

If not, the current value is tested against the maximum value by block 234. If the current value is greater than the maximum value, block 236 makes the value equal to the maximum value. Otherwise, the current value is between the minimum and maximum values and a return is made to the main procedure 100.

A value-in-range procedure 250 (FIG. 6H) is used in the present embodiment to determine whether domain values are within the selected range by comparison with current minimum and maximum values. Thus, test blocks 252 and 254 respectively check whether the value is greater than or equal to the minimum value and less than or equal to the maximum value.

If so, block 256 records the value in range. If either test is not true, block 258 records the value as not in range. The procedure 250 is then ended by block 260.

If desired, the encoded image editing is suitably extended to the full color image. In this manner, the full color edited image is made available for printing or other uses that require high resolution images.

Thus, the color key editing control includes a selectable option in which additional statistical data is tracked to improve the effectiveness of the color key editing algorithm in the HSB procedure 118 (FIG. 6A) when it is applied to continuous-tone 24-bit images as opposed to encoded images. The color key editing control can be requested to implement the option, and menus are provided for tracking HSB data for any of various statistical analysis procedures.

The average value of HSB is tracked for each small pixel block that is analyzed. As a result, in addition to tracking the global minimum and maximum HSB for all pixels within all small blocks, minimum and maximum average HSB values are tracked. The latter values better represent the color ranges that exist in the 24-bit image, and are used to define the ranges when an edit application is requested on a 24-bit image.

Figure 6J:
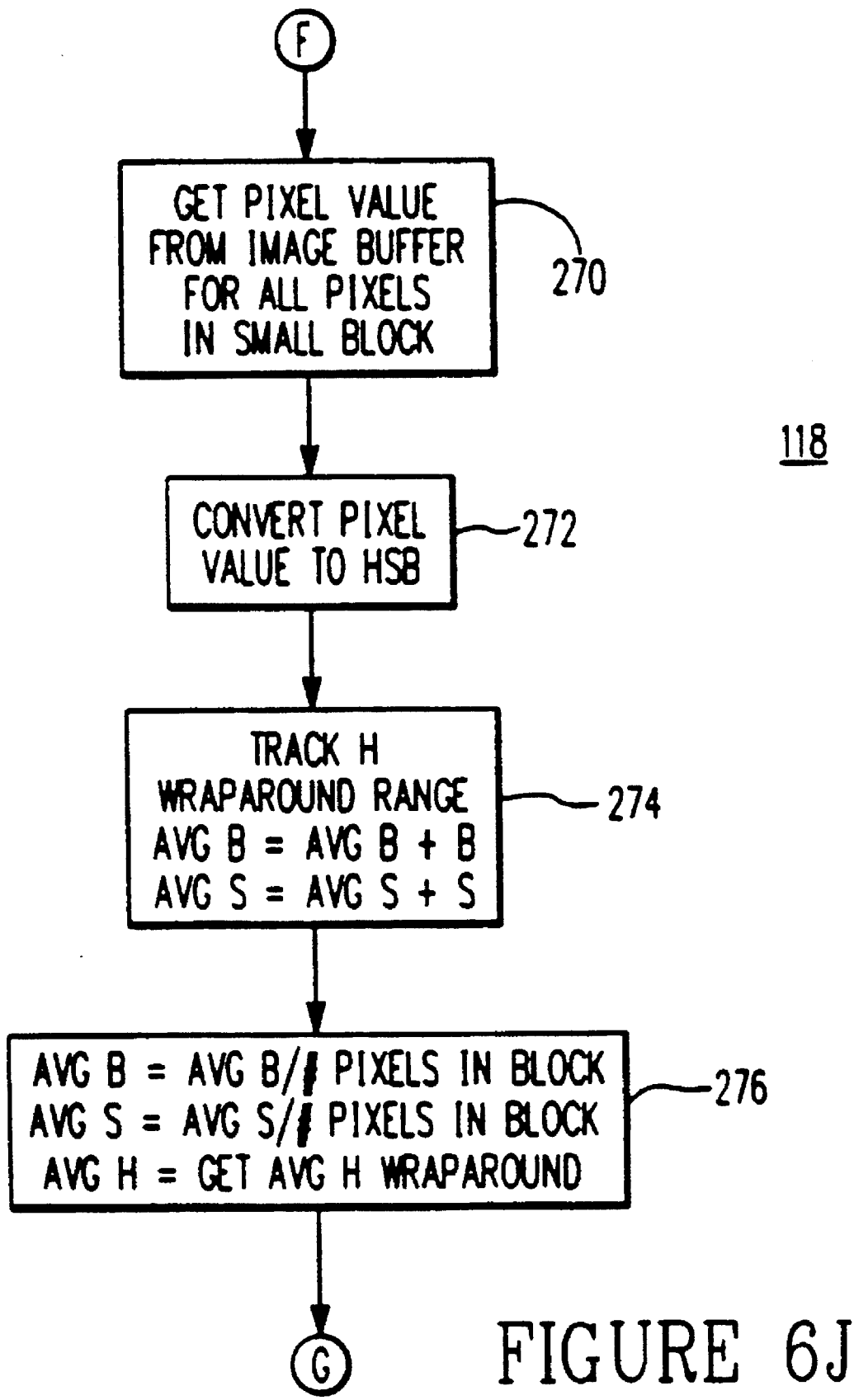
FIG. 6J shows a flow chart for a procedure used in the procedure of FIG. 6A to calculate average values of hue, saturation, and brightness.
Figure 6K:
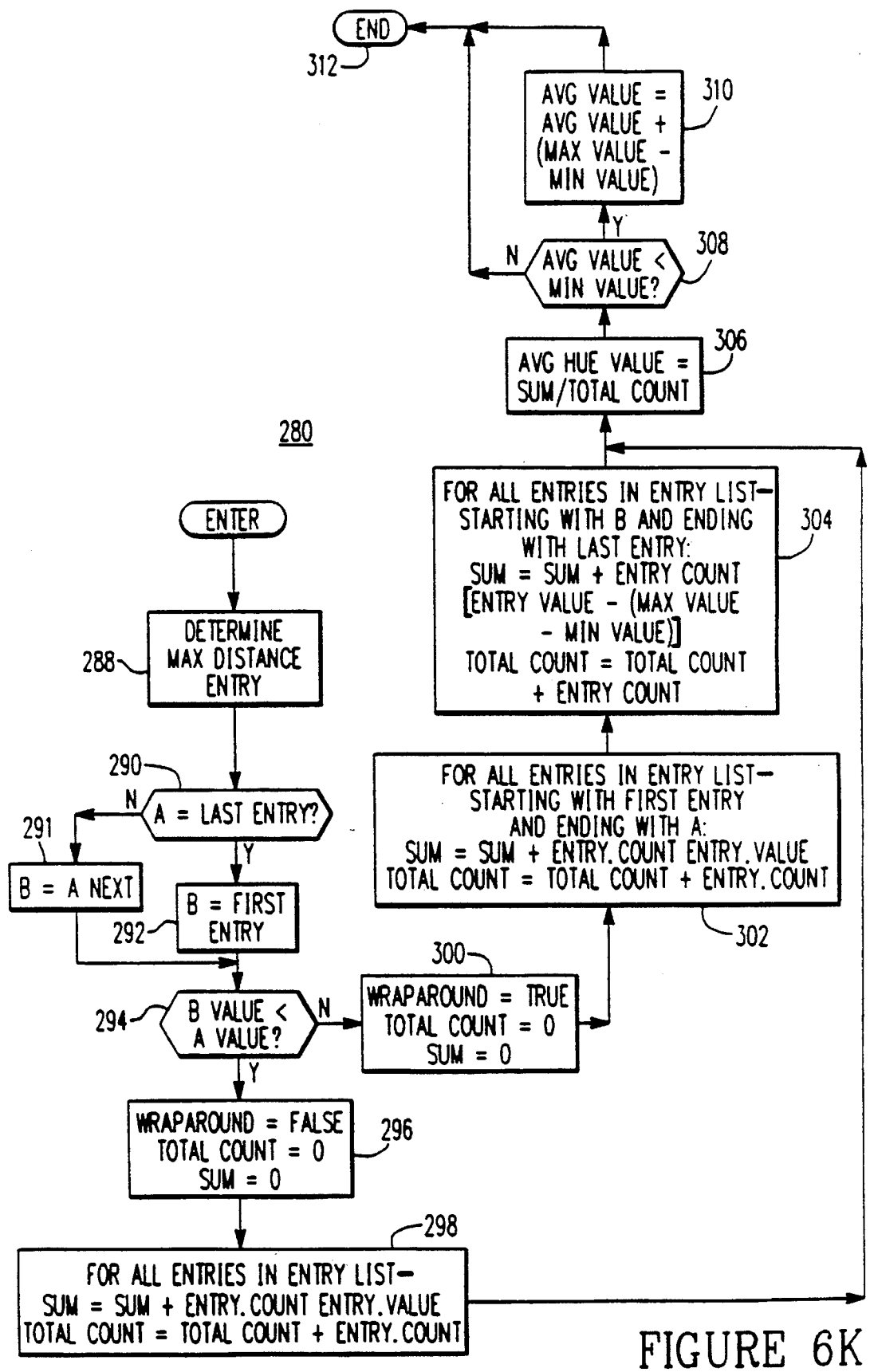
FIG. 6K illustrates a procedure for computing average hue for the procedure of FIG. 6A.

The average HSB procedure is shown in greater detail in FIG. 6J. For each mouse position, neighboring pixels in a small box around the position are processed to determine HSB values. Accordingly, block 270 gets the pixel color values for all 25 pixels in the small block.

Pixel color values are then converted to HSB values by block 272. In block 274, H wraparound range is tracked and B and S are calculated for the current pixel block as shown. Average B and S per block pixel are calculated in block 276 by dividing the pixel block totals by the number of pixels in the block. Average H wraparound is obtained from another procedure 280 shown in FIG. 6K.

In the average hue procedure 280, block 288 determines the maximum distance entry. Block 289 then makes A equal to the maximum distance entry. A test is made in block 290 to determine whether A equals the last entry. If so, B is made equal to the first entry in block 292 and block 294 tests whether B is less than A. If not, block 291 sets B equal to A.NEXT.

If B is less than A, block 296 records a false wraparound and sets total count equal to zero and sum equal to zero. Next, block 298 determines the sum and total count for all entries in the entry list using the equations shown.

If B is not less than A, block 300 records a true wraparound with sum and total count both equal to zero. Next, for all entries in the entry list starting at the first entry and ending with A, block 302 uses the indicated equations to calculate sum and total count. Block 304 the uses the indicated equations to calculate sum and total count for all entries in the entry list starting with B and ending with the last entry.

In block 306, the average hue value is calculated by dividing the sum by the total count for each entry from the blocks 298 and 304 for false and true wraparounds.

If the average hue value is less than the minimum value as checked in block 308, the average hue value is set equal to the average value plus the maximum value less the minimum value by block 310. The procedure 280 ends in block 312.

Once ranges in HSB have been selected, editing changes can be applied by modifying the color lookup tables 47. As previously indicated, the color lookup tables or CLUT are an array of RGB values. If the RGB value stored into the k-th entry of the CLUT array is changed, any displayed pixels that have a pixel value of k will be changed. One example of such editing is applying a hue rotation much like adjusting the hue on a television set. A hue rotation can be considered to be the addition of some ΔB to brightness and ΔS to saturation.

Figure 6L:
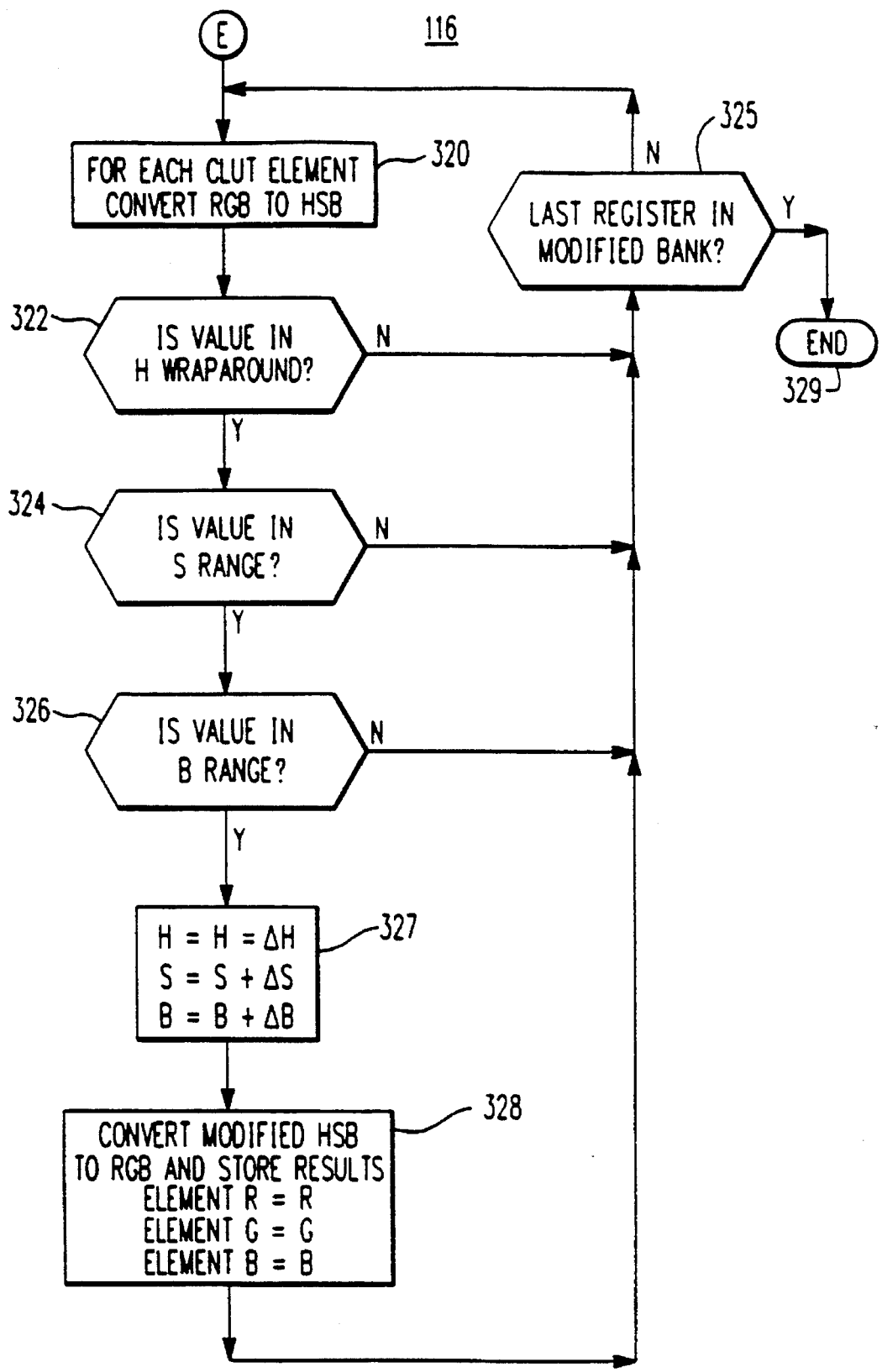
FIG. 6L shows a procedure for modifying color lookup tables that are used in applying an image edit operation.

The CLUT modification procedure is shown in greater detail in FIG. 6L. First, block 320 converts RGB values to HSB values for all CLUT registers. Test blocks 322, 324, and 326 then determine whether the values for the currently processed CLUT register are within the respective H, S, and B ranges.

In the preferred embodiment, if all three tests are true, the new value of H or S or B is set equal to the old value plus the editing change in block 327. If any one test is false, the new value of H or S or B is set equal to the old value and block 325 recycles to the block 320 for the next register modified in the working registers in the CLUT or ends in block 329 if the last register in the modified or working register bank has been processed.

Block 328 converts the new HSB values to RGB values for each CLUT element, and the new RGB values are restored to the CLUT 47 (FIG. 4), and the employed edit operation applies the resulting color set in the CLUT to the image pixels. Color changes occur for those pixels that index CLUT registers for which color changes have been made as a result of the range checking steps in the blocks 322, 324, and 326. After HSB conversion, a return is made to the main procedure 100.

In FIGS. 8A–8D, there are shown displays for four different exemplary cases of color key editing in accordance with the present invention. In each case, an image window is shown with its top level menu and an image as edited by the particular editing control applied by an operator through an editor control window.

Figure 8A:
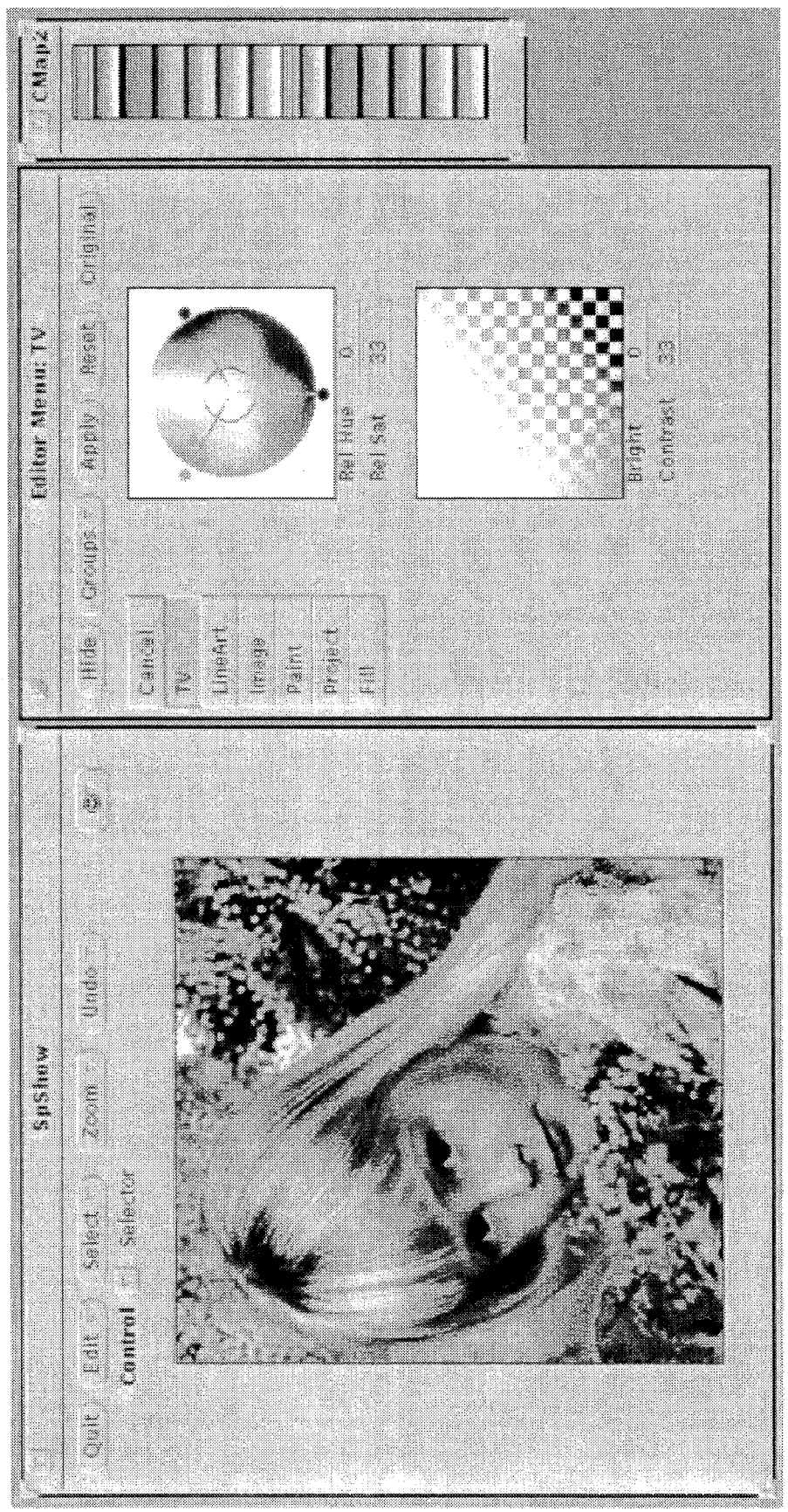
FIGS. 8A–8D show window display results for four different exemplary cases of color key editing performed in accordance with the present invention.
Figure 8B:
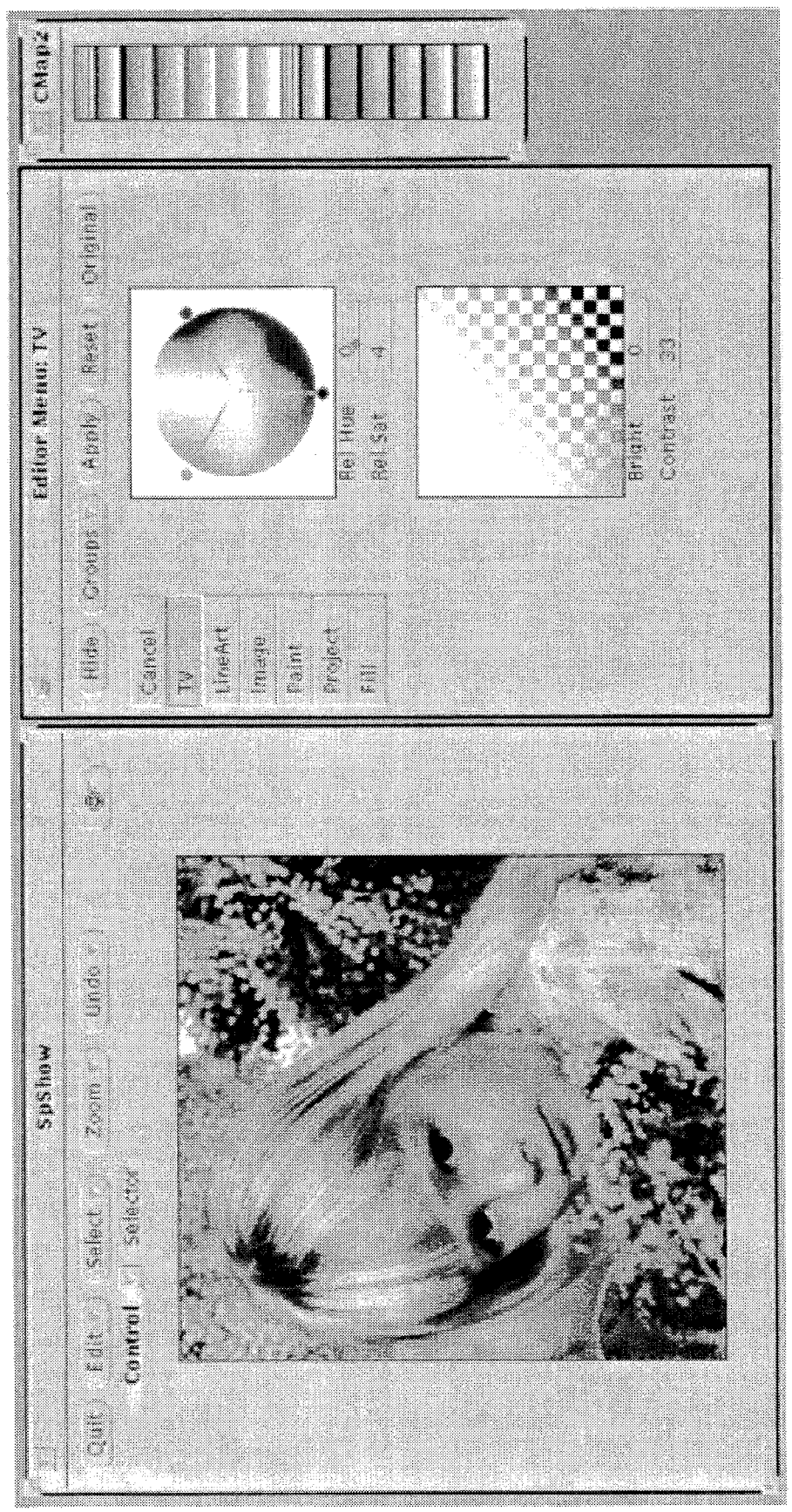
Figure 8C:
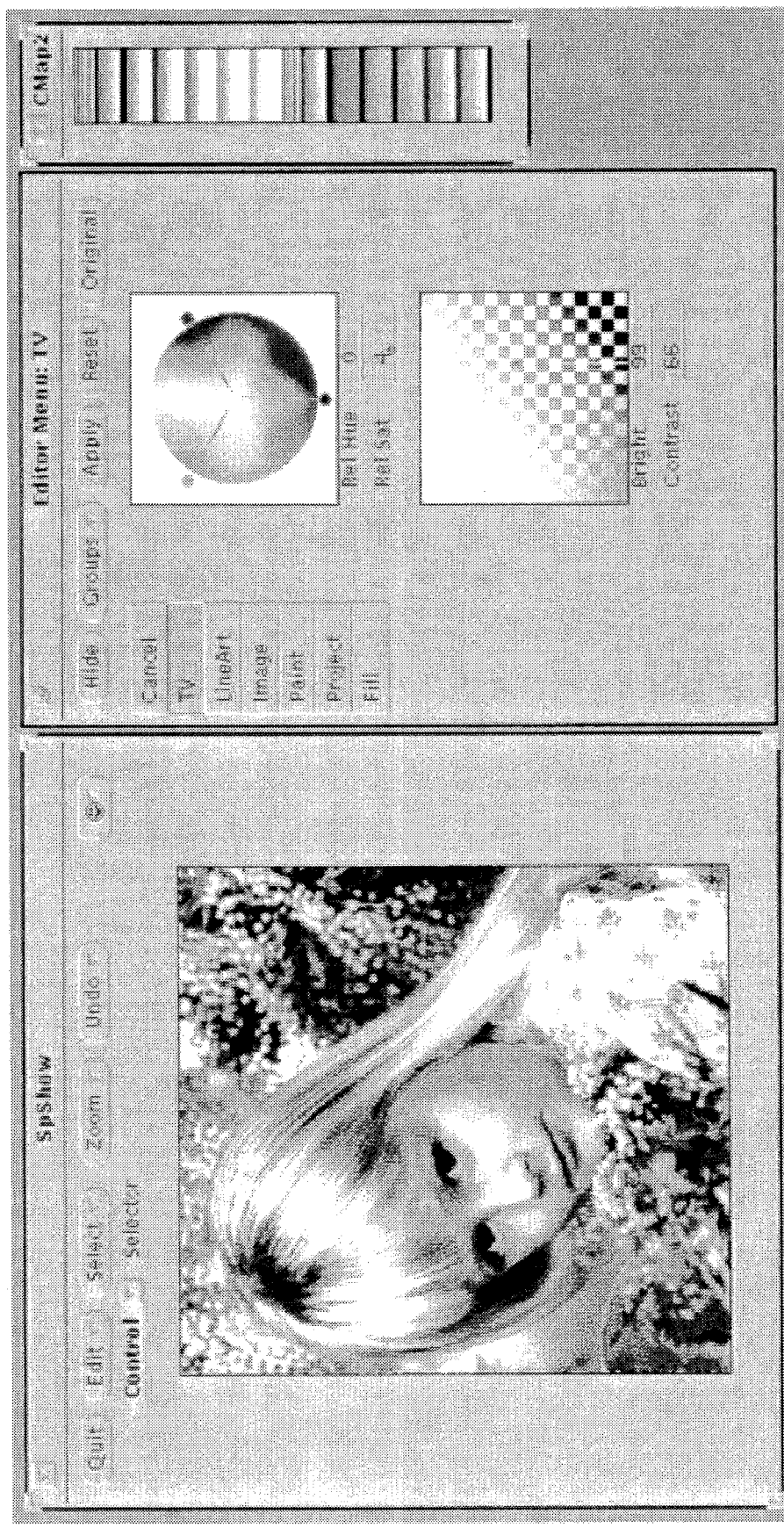

In FIGS. 8A–8C, the selected edit operation from the menu is TV Image, and the active areas employ the color dot graphic and the brightness-contrast checkerboard graphic with their crossed hairline overlays. The values for relative hue and saturation and brightness and contrast are displayed below the graphic areas.

Figure 8D:
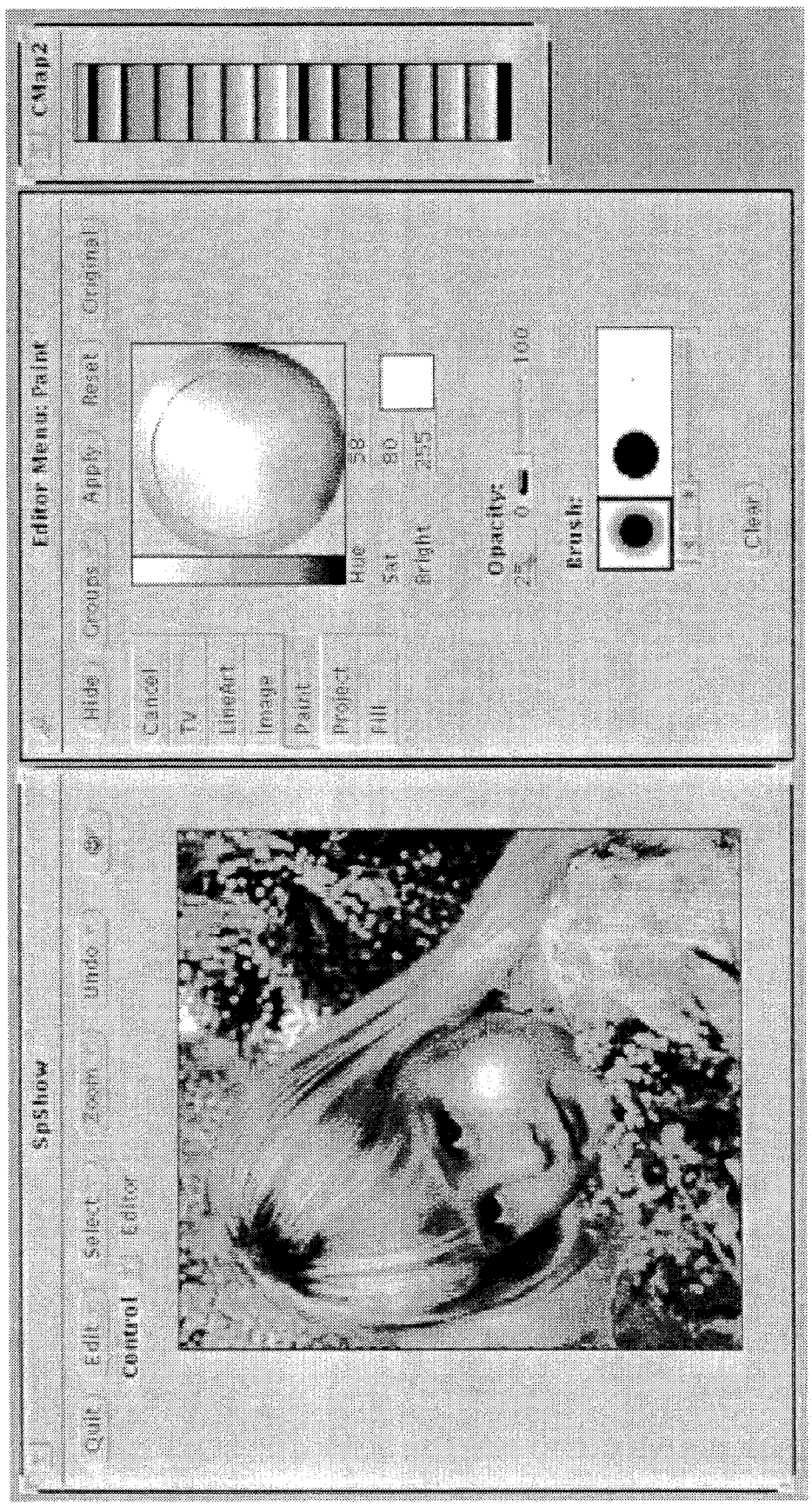

FIG. 8D is similar but it illustrates a paint selection for the edit operation. The graphic is the color wheel with rotating radial line overlay and adjustable concentric ring overlay. The selected paint color is displayed in an active area box before it is applied to the image. Values of H, S and V (B) for the selected color are displayed. In this case some brushing of the selected yellow color has been done on the girl's cheek in the image.

The foregoing description of the preferred embodiment of the invention has been presented for purposes of illustration and description. The description is not intended to be exhaustive or to limit the invention to the precise form disclosed, and modifications and variations of the invention are possible in light of the above disclosure or may be acquired from practice of the invention. It is intended that the description provide an explanation of the principles of the invention and its practical application to enable one skilled in the art to use the invention in various embodiments and with various modifications as are suited to the particular use contemplated. It is intended that the scope of the invention be defined by the claims appended hereto, and their equivalents.

What is claimed is:

1. An image editor for an image processing system having a limited set of system colors that is a sub set of a high resolution set of colors, said editor comprising:

first means for storing data for an image employing the high resolution set of colors;

means for encoding the stored image data to generate color pixel data for an encoded image in accordance with a reduced set of system colors substantially reduced from the limited set of system colors such that each pixel is accorded a separate color data value based on the reduced color set;

second means for storing the color pixel data for the encoded image;

means for displaying the stored color pixel data for the encoded image on a monitor screen;

means for designating displayed colors that a user desires to modify in a region of the displayed image;

means for detecting pixel position data corresponding to the designated colors;

first means for determining and storing data corresponding to the designated colors;

second means for determining and storing values for at least one color variable from said stored color pixel data for said pixel position data;

means for determining a minimum range of values for said color variable that encompass colors designated by said designating means;

means for applying a preselected color edit operation to encoded image pixels identified to have colors corresponding to color variable values within the minimum range to provide an edited encoded image; and means for transforming the range of values for the color variable to generate an edited, high-resolution, non-encoded image.

2. The image editor of claim 1 wherein:

said second determining and storing means determines and stores respective values for multiple color descriptor variables and respective standard deviations corresponding thereto;

said range determining means determines a minimum range of values for each of the color descriptor variables;

said applying means applies the edit operation to encoded image pixels having colors corresponding to those color descriptor variable values within at least one of the minimum ranges;

said transforming means transforms the range of color values for each color variable by adding to the range of color values a value equal to a predetermined constant ±k times the corresponding standard deviation of color variable values in the range of color values.

3. The image editor of claim 2 wherein the color descriptor variables are hue, saturation and brightness.

4. The image editor of claim 1 wherein: said designating means includes means for specifying successive encoded image positions having desired color(s); and said position detecting means detects pixels in a small image area around each specified position.

5. The image editor of claim 4 wherein a mouse specifies the successive encoded image positions in a click and drag operation.

6. The image editor of claim 4 wherein:

said second determining and storing means determines and stores respective values for multiple color descriptor variables;

said range determining means determines a minimum range of values for each of the color descriptor variables; and said applying means applies the edit operation to encoded image pixels having colors corresponding to those color descriptor variable values within the respective minimum ranges.

7. The image editor of claim 6 wherein the color descriptor variables are hue, saturation and brightness.

8. The image editor of claim 3 wherein:

said second storing means includes an encoded image pixel buffer and a lookup color register bank;

said lookup color register bank having a modifiable register for storing basic color component values for each color in the reduced set of system colors;

said encoded image pixel buffer having encoded image pixel registers each of which is indexed to a particular lookup color register to display the color required for that pixel;

said edit applying means includes means for testing each of said modifiable lookup-table registers to determine those stored color values that correspond to hue, saturation and brightness values within the minimum ranges therefor; and said edit applying means further includes means for modifying those modifiable lookup-table registers having in-range hue, saturation and brightness values in accordance with the edit operation.

9. The image editor of claim 1 wherein:

said one color variable is a color descriptor variable having values defined in a circular domain; and said minimum range determining means includes:

means for sorting said stored values for said variable in value order and for determining the greatest value distance between adjacent stored values A and B;

means for comparing the A and B values to determine whether the selected range is or is not a wraparound range; and said applying means includes means for determining whether each pixel has a color corresponding to a color descriptor variable in the selected wraparound or non-wraparound range.

10. The image editor of claim 9 wherein:

the color descriptor variable is hue; and said applying means determines each pixel hue value to be in range if it is greater than the B hue value and less than the A hue value if the selected range is a non-wraparound range; and said applying means determines each pixel hue value to be in range if it is greater than the B hue value or less than the A hue value if the selected range is a wraparound range.

11. The image editor of claim 3 wherein:

said designating means includes means for specifying successive encoded image positions having the desired color(s);

said position detecting means detects pixels in a small image area around each specified position;

means are provided for determining respective average values of hue, saturation and brightness (HSB) for pixels in each of said small encoded image areas; and said range determining means determines a minimum range of average values for each of said HSB descriptor variables for application to full color edit operations on the encoded image.

12. The image editor of claim 3 wherein said second determining and storing means includes means for converting said color pixel data for said pixel position data to hue, saturation and brightness values.

13. The image editor of claim 3 wherein said applying means applies the edit operation to encoded image pixel colors corresponding to those color descriptor variable values within all of the minimum ranges.

14. The image editor of claim 2 wherein said designating means includes means for specifying successive encoded image positions having the desired color(s);

said position detecting means detects pixels in a small image area around each specified position;

means are provided for statistically analyzing color descriptor variable values to provide respective statistical values for each descriptor variable for pixels in each of said small image areas; and said minimum range determining means determines a minimum range of statistical values for each of said color descriptor variables for application to full color edit operations.

15. The image editor of claim 14 wherein said statistical analyzing means provides average values for each descriptor variable.

16. The image editor of claim 1 wherein the high resolution set of system colors is a twenty-four-bit system and the reduced set of system colors is an eight-bit system.

17. A method for editing an image in an image processing system having a limited set of systems colors that is a sub set of a high resolution set of colors, the steps of said method comprising:

storing data for an image employing the high-resolution set of system colors;

encoding the stored image data to generate color pixel data for an encoded image in accordance with a set of system colors substantially reduced from the limited set of system colors such that each pixel is accorded a separate color data value based on the reduced color set;

storing the color pixel data for the encoded image;

displaying the stored color pixel data for the encoded image on a monitor screen;

designating displayed colors that a user desires to modify in a region of the displayed image;

detecting pixel position data corresponding to the designated colors;

determining and storing data corresponding to the designated colors;

determining and storing values for at least one color variable from said stored color pixel data for said pixel position data;

determining a minimum range of values for said color variable that encompass colors designated by said designating step; and applying a preselected color edit operation to encoded image pixels identified to have colors corresponding to color variable values within the minimum range; and transforming the range of values for the color variable to generate an edited, high-resolution, non-encoded image.

18. The method of claim 17 wherein:

said determining and storing step determines and stores respective values for multiple color descriptor variables;

said minimum range determining step determines a minimum range of values for each of the color descriptor variables; and said applying step applies the edit operation to encoded image pixels having colors corresponding to those color descriptor variable values within the respective minimum ranges.

19. The method of claim 18 wherein the color descriptor variables are hue, saturation, and brightness.

* * * * *